United States Patent

Sato et al.

[11] Patent Number: 6,047,085
[45] Date of Patent: *Apr. 4, 2000

[54] IMAGE IDENTIFYING APPARATUS

[75] Inventors: Toshio Sato, Yokohama; Teruhiko Uno, Mitaka; Toshio Hirasawa, Kawasaki; Hiroshi Takahashi, Okegawa; Kazuyo Nakagawa, Yokohama, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/765,814
[22] PCT Filed: Jul. 21, 1994
[86] PCT No.: PCT/JP94/01200
    § 371 Date: Jan. 17, 1997
    § 102(e) Date: Jan. 17, 1997
[87] PCT Pub. No.: WO96/03716
    PCT Pub. Date: Feb. 8, 1996
[51] Int. Cl.[7] ........................................... G06K 9/00
[52] U.S. Cl. ........................................... 382/165; 382/166
[58] Field of Search ..................................... 382/103, 135, 382/165, 164, 209, 278, 167; 358/296, 401, 448, 501, 518

[56] References Cited

U.S. PATENT DOCUMENTS

| | | | |
|---|---|---|---|
| 4,208,652 | 6/1980 | Marshall | 382/135 |
| 4,386,432 | 5/1983 | Nakamura et al. | 382/135 |
| 4,747,148 | 5/1988 | Watanabe et al. | 382/278 |
| 4,790,022 | 12/1988 | Dennis | 382/135 |
| 5,162,899 | 11/1992 | Naka et al. | 382/167 |
| 5,189,712 | 2/1993 | Kajiwara et al. | 382/278 |
| 5,604,596 | 2/1997 | Ukai et al. | 382/135 |
| 5,644,765 | 7/1997 | Shimura et al. | 382/165 |

FOREIGN PATENT DOCUMENTS

| | | |
|---|---|---|
| 0 194 148 A3 | 9/1986 | European Pat. Off. . |
| 4-54681 | 2/1992 | Japan . |
| 5-151277 | 6/1993 | Japan . |
| 5-176962 | 7/1993 | Japan . |

OTHER PUBLICATIONS

"Interpretation of Natural Scenes using Multi–parameter Default Models & Qualitative Constraints", Michael Hild et al IEEE, p497–501, 1993.

Andreadis et al., "Image Pixel Classification by Chromaticity Analysis", Pattern Recognition Letters, 11(1):51–58 (1991).

S. Tominaga, "Color Image Segmentation Using Three Perceptual Attributes", IEEE Computer society Press, p. 628–630 (1986).

Primary Examiner—Amelia Au
Assistant Examiner—Samir Ahmed
Attorney, Agent, or Firm—Finnegan, Henderson, Farabow, Garrett & Dunner, L.L.P.

[57] ABSTRACT

Apparatus and method for identifying the color image of an object. The object's image is digitized and a cut-off portion of the image containing the object is determined. The cut-off portion image data is normalized. Selected pixels of the normalized image are subjected to an averaging process to provide an averaged image containing R, G, and B color components. H, V, and C components of the averaged image data are computed, and their V, c, and d components are computed from the H, V, and C components. A color feature extractor computes from the c and d component data a parameter representative of the object to be identified. This parameter is provided to a memory controller to retrieve from a memory that stores target images one or more images categorized according to the computed parameter. A matching section matches each retrieved target image with the Vcd component data and determines which target image is most similar.

20 Claims, 36 Drawing Sheets

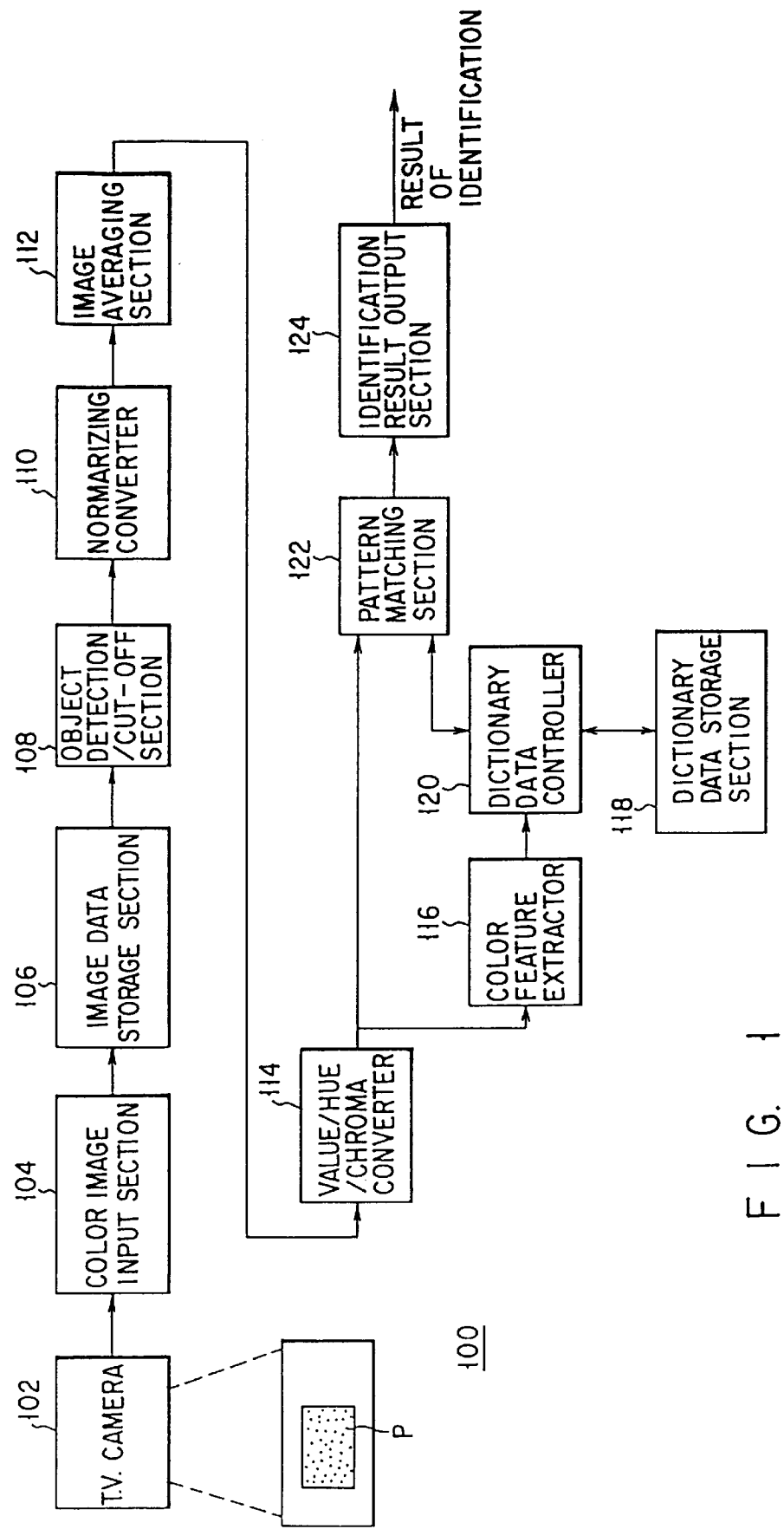
F I G. 1

FIG. 4

| | | | | | | | | | | | | | | | | | |
|---|---|---|---|---|---|---|---|---|---|---|---|---|---|---|---|---|---|
| 0 | 0 | 0 | 0 | 0 | 0 | 0 | 0 | 0 | | 0 | 0 | 0 | 0 | 0 | 0 | 0 | 0 |
| 0 | 0 | 0 | 0 | 0 | 0 | 0 | 0 | 0 | | 0 | 0 | 0 | 0 | 0 | 0 | 0 | 0 |
| 0 | 0 | 51 | 51 | 51 | 45 | 51 | 51 | 51 | | 50 | 51 | 50 | 0 | 50 | 0 | 0 | 0 |
| 0 | 0 | 50 | 50 | 51 | 51 | 51 | 51 | 51 | | 49 | 51 | 50 | 50 | 50 | 50 | 0 | 0 |
| 0 | 0 | 50 | 50 | 51 | 55 | 50 | 51 | 49 | -- | 50 | 50 | 51 | 51 | 51 | 50 | 0 | 0 |
| 0 | 0 | 49 50 | 49 50 | 51 | 50 | 51 | 51 | 49 | | 51 | 50 | 50 | 50 | 51 | 51 | 0 | 0 |
| 0 | 0 | 49 | 49 | 50 | 50 | 51 | 51 | 51 | | 51 | 50 | 50 | 51 | 50 | 51 | 0 | 0 |
| 0 | 0 | 50 | 50 | 51 | 50 | 51 | 50 | 51 | | 47 | 51 | 50 | 50 | 51 | 50 | 0 | 0 |
| 0 | 0 | 51 | 50 | 50 | 51 | 50 | 51 | 51 | | 51 | 51 | 51 | 51 | 50 | 50 | 0 | 0 |
| | | ⋮ | | | | | | | | | | | ⋮ | | | | |
| 0 | 0 | 51 | 50 | 50 | 50 | 50 | 50 | 51 | | 49 | 50 | 50 | 50 | 50 | 50 | 0 | 0 |
| 0 | 0 | 50 | 50 | 51 | 51 | 50 | 51 | 45 51 | | 50 | 50 | 51 | 50 | 51 | 50 | 0 | 0 |
| 0 | 0 | 51 | 51 | 51 | 50 | 51 | 51 | 25 | | 51 | 50 | 51 | 51 | 50 | 51 | 0 | 0 |
| 0 | 0 | 51 | 50 | 50 | 50 | 51 | 51 | 50 | | 51 | 50 | 51 | 50 | 51 | 50 | 0 | 0 |
| 0 | 0 | 50 | 50 | 51 | 51 | 51 | 51 | 50 | | 51 | 51 | 51 | 51 | 50 | 51 | 0 | 0 |
| 0 | 0 | 42 | 50 | 51 | 51 | 51 | 51 | 50 | | 51 | 51 | 51 | 51 | 50 | 51 | 0 | 0 |
| 0 | 0 | 41 41 | 41 | 51 | 51 | 51 | 51 | 50 | -- | 51 | 51 | 50 | 51 | 51 | 51 | 0 | 0 |
| 0 | 0 | 40 | 40 | 40 | 50 | 50 | 49 | 50 | | 51 | 51 | 51 | 51 | 51 | 50 | 0 | 0 |
| 0 | 0 | 0 | 0 | 41 | 41 | 50 | 49 | 50 | | 51 | 51 | 50 | 51 | 51 | 50 | 0 | 0 |
| 0 | 0 | 0 | 0 | 0 | 0 | 0 | 0 | 0 | | 0 | 0 | 0 | 0 | 0 | 0 | 0 | 0 |
| 0 | 0 | 0 | 0 | 0 | 0 | 0 | 0 | 0 | | 0 | 0 | 0 | 0 | 0 | 0 | 0 | 0 |

| 10 | 10 | 10 | 10 | 10 | 10 | 10 | 10 | 10 | 10 | 10 | 10 | 10 | 10 | 10 | 10 | 10 | 10 | 10 |
|----|----|----|----|----|----|----|----|----|----|----|----|----|----|----|----|----|----|----|
| 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 25 | 25 | 50 | 50 | 50 | 50 | 51 | 51 | 52 | 52 | 56 | 56 | 11 |
| 10 | 10 | 10 | 10 | 10 | 10 | 25 | 25 | 50 | 50 | 50 | 50 | 51 | 51 | 52 | 52 | 56 | 56 | 11 |
| 10 | 10 | 10 | 10 | 10 | 10 | 25 | 25 | 50 | 50 | 50 | 50 | 51 | 51 | 52 | 52 | 56 | 56 | 11 |
| 10 | 10 | 10 | 10 | 40 | 40 | 26 | 26 | 30 | 30 | 40 | 40 | 41 | 41 | 45 | 45 | 50 | 50 | 11 |
| 10 | 10 | 10 | 10 | 40 | 40 | 26 | 26 | 30 | 30 | 40 | 40 | 41 | 41 | 45 | 45 | 50 | 50 | 11 |
| 10 | 10 | 10 | 10 | 40 | 40 | 26 | 26 | 30 | 30 | 40 | 40 | 41 | 41 | 45 | 45 | 50 | 50 | 11 |
| 10 | 10 | 10 | 10 | 30 | 30 | 27 | 27 | 35 | 35 | 45 | 45 | 64 | 64 | 63 | 63 | 64 | 64 | 11 |
| 10 | 10 | 10 | 10 | 30 | 30 | 27 | 27 | 35 | 35 | 45 | 45 | 64 | 64 | 63 | 63 | 64 | 64 | 11 |
| 10 | 10 | 10 | 10 | 30 | 30 | 27 | 27 | 35 | 35 | 45 | 45 | 64 | 64 | 63 | 63 | 64 | 64 | 11 |
| 10 | 10 | 32 | 32 | 31 | 31 | 40 | 40 | 40 | 40 | 60 | 60 | 63 | 63 | 132 | 132 | 64 | 64 | 11 |
| 10 | 10 | 32 | 32 | 31 | 31 | 40 | 40 | 40 | 40 | 60 | 60 | 63 | 63 | 132 | 132 | 64 | 64 | 11 |
| 10 | 10 | 32 | 32 | 31 | 31 | 40 | 40 | 40 | 40 | 60 | 60 | 63 | 63 | 132 | 132 | 64 | 64 | 11 |
| 10 | 10 | 10 | 10 | 41 | 41 | 41 | 41 | 42 | 42 | 62 | 62 | 120 | 120 | 136 | 136 | 63 | 63 | 11 |
| 10 | 10 | 10 | 10 | 41 | 41 | 41 | 41 | 42 | 42 | 62 | 62 | 120 | 120 | 136 | 136 | 63 | 63 | 11 |
| 10 | 10 | 10 | 10 | 41 | 41 | 41 | 41 | 42 | 42 | 62 | 62 | 120 | 120 | 136 | 136 | 63 | 63 | 11 |
| 10 | 10 | 10 | 10 | 50 | 50 | 50 | 50 | 40 | 40 | 62 | 62 | 63 | 63 | 63 | 63 | 64 | 64 | 11 |
| 10 | 10 | 10 | 10 | 50 | 50 | 50 | 50 | 40 | 40 | 62 | 62 | 63 | 63 | 63 | 63 | 64 | 64 | 11 |
| 10 | 10 | 10 | 10 | 50 | 50 | 50 | 50 | 40 | 40 | 62 | 62 | 63 | 63 | 63 | 63 | 64 | 64 | 11 |
| 10 | 10 | 11 | 11 | 11 | 11 | 11 | 11 | 12 | 12 | 12 | 12 | 12 | 12 | 13 | 13 | 13 | 13 | 11 |
| 10 | 10 | 11 | 11 | 11 | 11 | 11 | 11 | 12 | 12 | 12 | 12 | 12 | 12 | 13 | 13 | 13 | 13 | 11 |
| 10 | 10 | 11 | 11 | 11 | 11 | 11 | 11 | 12 | 12 | 12 | 12 | 12 | 12 | 13 | 13 | 13 | 13 | 11 |
| 11 | 11 | 10 | 10 | 11 | 11 | 10 | 10 | 10 | 10 | 10 | 10 | 10 | 10 | 10 | 10 | 10 | 10 | 10 |
| 11 | 11 | 10 | 10 | 11 | 11 | 10 | 10 | 10 | 10 | 10 | 10 | 10 | 10 | 10 | 10 | 10 | 10 | 10 |
| 11 | 11 | 10 | 10 | 11 | 11 | 10 | 10 | 10 | 10 | 10 | 10 | 10 | 10 | 10 | 10 | 10 | 10 | 10 |

F I G. 8

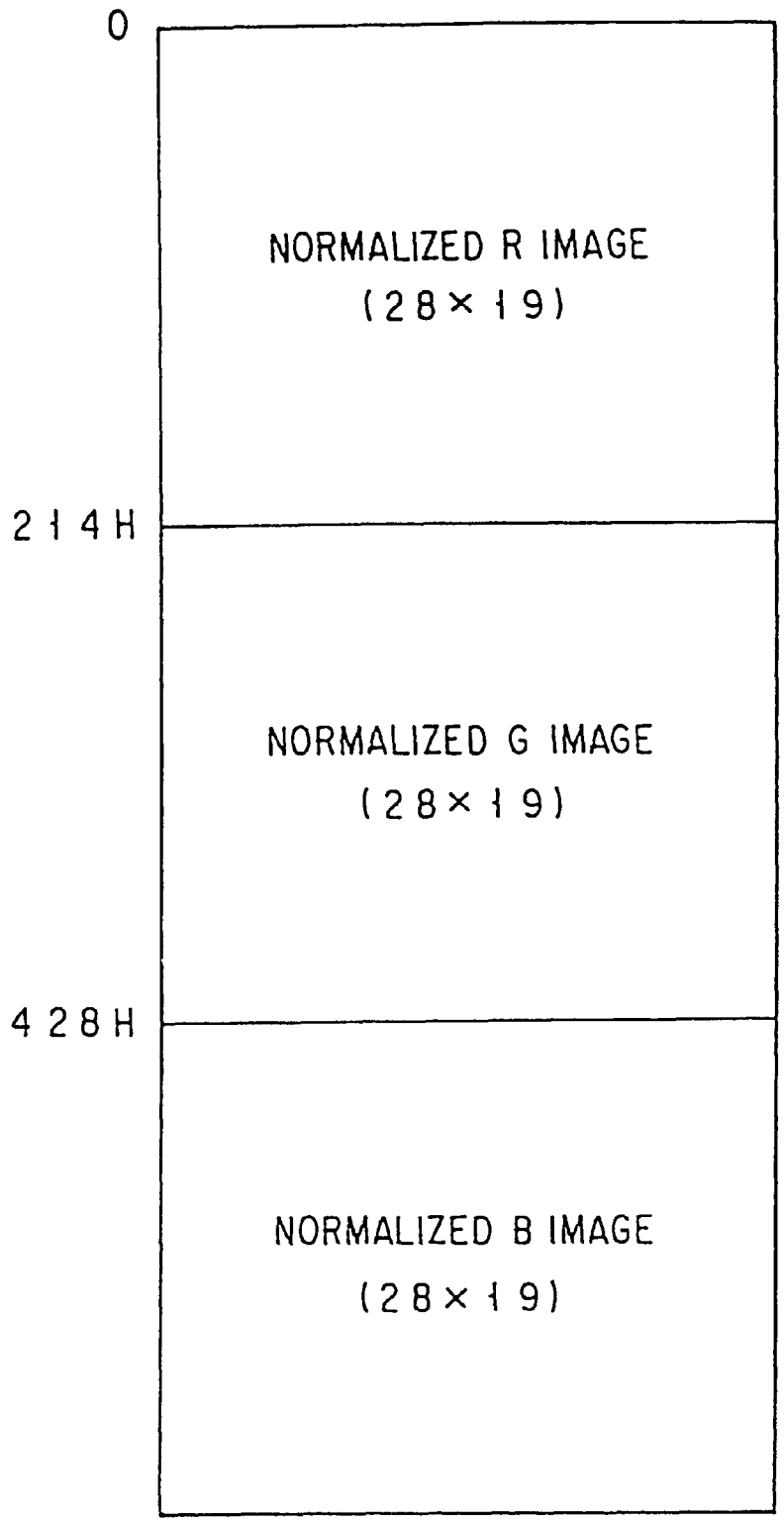
F I G. 9

FIG. 11

|     |     |   |     |     |
|-----|-----|---|-----|-----|
| 1/2 | 1/2 | 1 | 1/2 | 1/2 |
| 1/2 | 1/2 | 1 | 1/2 | 1/2 |
| 1   | 1   | 2 | 1   | 1   |
| 1/2 | 1/2 | 1 | 1/2 | 1/2 |
| 1/2 | 1/2 | 1 | 1/2 | 1/2 |

F I G. 12

7 PIXELS

| 4 | 7  | 7  | 7  | 7  | 7   | 4  |
|---|----|----|----|----|-----|----|
| 7 | 10 | 15 | 22 | 24 | 24  | 12 |
| 7 | 13 | 27 | 41 | 48 | 51  | 22 |
| 7 | 19 | 31 | 34 | 47 | 52  | 22 |
| 8 | 20 | 32 | 40 | 63 | 75  | 25 |
| 9 | 25 | 37 | 47 | 83 | 102 | 25 |
| 7 | 21 | 44 | 49 | 90 | 94  | 25 |
| 7 | 19 | 36 | 37 | 50 | 47  | 20 |
| 7 | 11 | 11 | 11 | 11 | 12  | 8  |
| 5 | 7  | 7  | 7  | 7  | 7   | 4  |

10 PIXELS

F I G. 13

|   |   |   |   |   |   |   |
|---|---|---|---|---|---|---|
| 4 | 7 | 7 | 7 | 7 | 7 | 4 |
| 7 | 10 | 15 | 22 | 24 | 24 | 12 |
| 7 | 13 | 27 | 41 | 48 | 51 | 22 |
| 7 | 19 | 31 | 34 | 47 | 52 | 22 |
| 8 | 20 | 32 | 40 | 63 | 75 | 25 |
| 9 | 25 | 37 | 47 | 83 | 102 | 25 |
| 7 | 21 | 44 | 49 | 90 | 94 | 25 |
| 7 | 19 | 36 | 37 | 50 | 47 | 20 |
| 7 | 11 | 11 | 11 | 11 | 12 | 8 |
| 5 | 7 | 7 | 7 | 7 | 7 | 4 |
| 5 | 11 | 11 | 11 | 11 | 11 | 5 |
| 8 | 15 | 18 | 25 | 29 | 30 | 15 |
| 8 | 15 | 31 | 43 | 51 | 55 | 25 |
| 9 | 22 | 33 | 41 | 64 | 78 | 27 |
| 11 | 27 | 39 | 49 | 86 | 112 | 33 |
| 13 | 28 | 39 | 51 | 88 | 113 | 27 |
| 9 | 23 | 48 | 52 | 101 | 105 | 28 |
| 9 | 25 | 41 | 39 | 53 | 47 | 21 |
| 8 | 13 | 13 | 13 | 13 | 15 | 9 |
| 5 | 11 | 11 | 11 | 11 | 11 | 5 |
| 9 | 13 | 13 | 15 | 15 | 15 | 9 |
| 7 | 11 | 11 | 19 | 21 | 21 | 11 |
| 7 | 10 | 24 | 28 | 41 | 33 | 18 |
| 7 | 17 | 35 | 41 | 50 | 63 | 18 |
| 10 | 15 | 22 | 33 | 74 | 67 | 18 |
| 7 | 14 | 28 | 41 | 95 | 113 | 18 |
| 7 | 16 | 39 | 41 | 101 | 102 | 17 |
| 7 | 14 | 31 | 32 | 41 | 42 | 12 |
| 7 | 17 | 17 | 17 | 17 | 18 | 9 |
| 9 | 13 | 13 | 14 | 14 | 14 | 9 |

F I G. 1 4

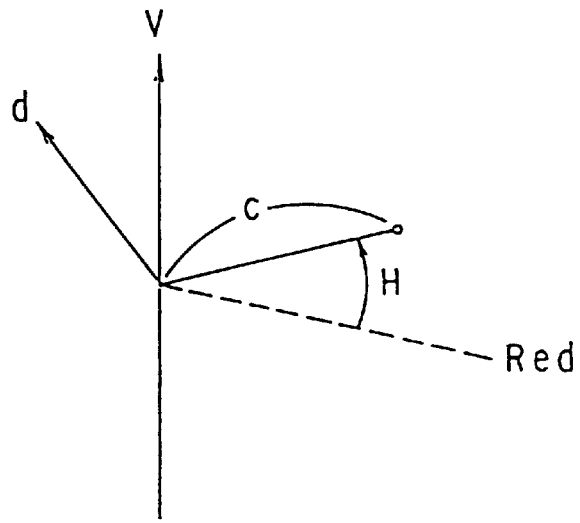
F I G. 16
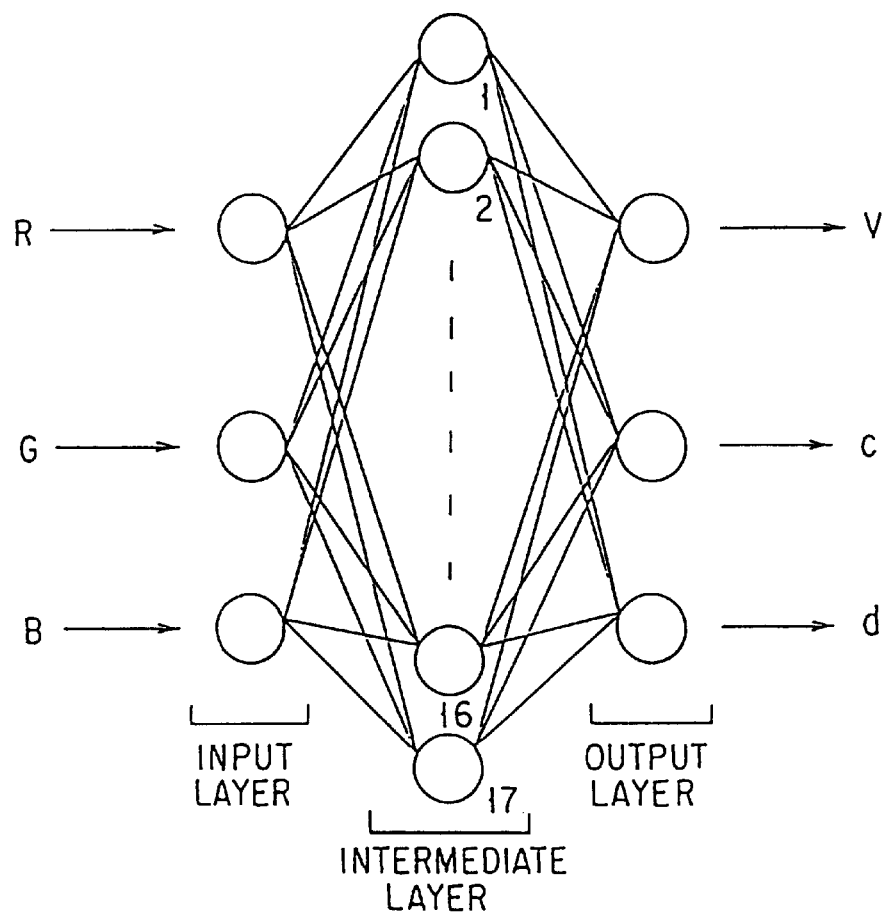
F I G. 17

| V | C | H | Y | x | y |
|---|---|---|---|---|---|
| 9 | 6 | $2.5R = \frac{39}{40} \times 2\pi$ | 78.66 | 0.3665 | 0.3183 |
| 9 | 4 | 2.5R | 78.66 | 0.3445 | 0.3179 |
| 9 | 2 | 2.5R | 78.66 | 0.3220 | 0.3168 |
| 9 | 1 | 2.5R | 78.66 | — | — |
| 8 | 10 | 2.5R | 59.10 | 0.4125 | 0.3160 |
| 8 | 8 | 2.5R | 59.10 | 0.3900 | 0.3171 |
| 8 | 6 | 2.5R | 59.10 | 0.3071 | 0.3175 |
| ⋮ | ⋮ | ⋮ | ⋮ | ⋮ | ⋮ |

FIG. 20 PATTERN MATCHING SECTION 122 AND COLOR FEATURE EXTRACTOR 116

| R — | |
|---|---|
| CATEGORY R-1 | V IMAGE |
| CATEGORY R-1 | c IMAGE |
| CATEGORY R-1 | d IMAGE |
| CATEGORY R-2 | V IMAGE |
| CATEGORY R-2 | c IMAGE |
| CATEGORY R-2 | d IMAGE |
| | |

⋮

| YR — | |
|---|---|
| CATEGORY YR-1 | V IMAGE |
| CATEGORY YR-1 | c IMAGE |
| CATEGORY YR-1 | d IMAGE |
| CATEGORY YR-2 | V IMAGE |
| CATEGORY YR-2 | c IMAGE |
| CATEGORY YR-2 | d IMAGE |
| | |

⋮

Y —

G —

⋮

| NC — | |
|---|---|
| CATEGORY NC-1 | V IMAGE |
| CATEGORY NC-1 | c IMAGE |
| CATEGORY NC-1 | d IMAGE |
| CATEGORY NC-2 | V IMAGE |
| CATEGORY NC-2 | c IMAGE |
| CATEGORY NC-2 | d IMAGE |
| | |

F I G. 2 3 A

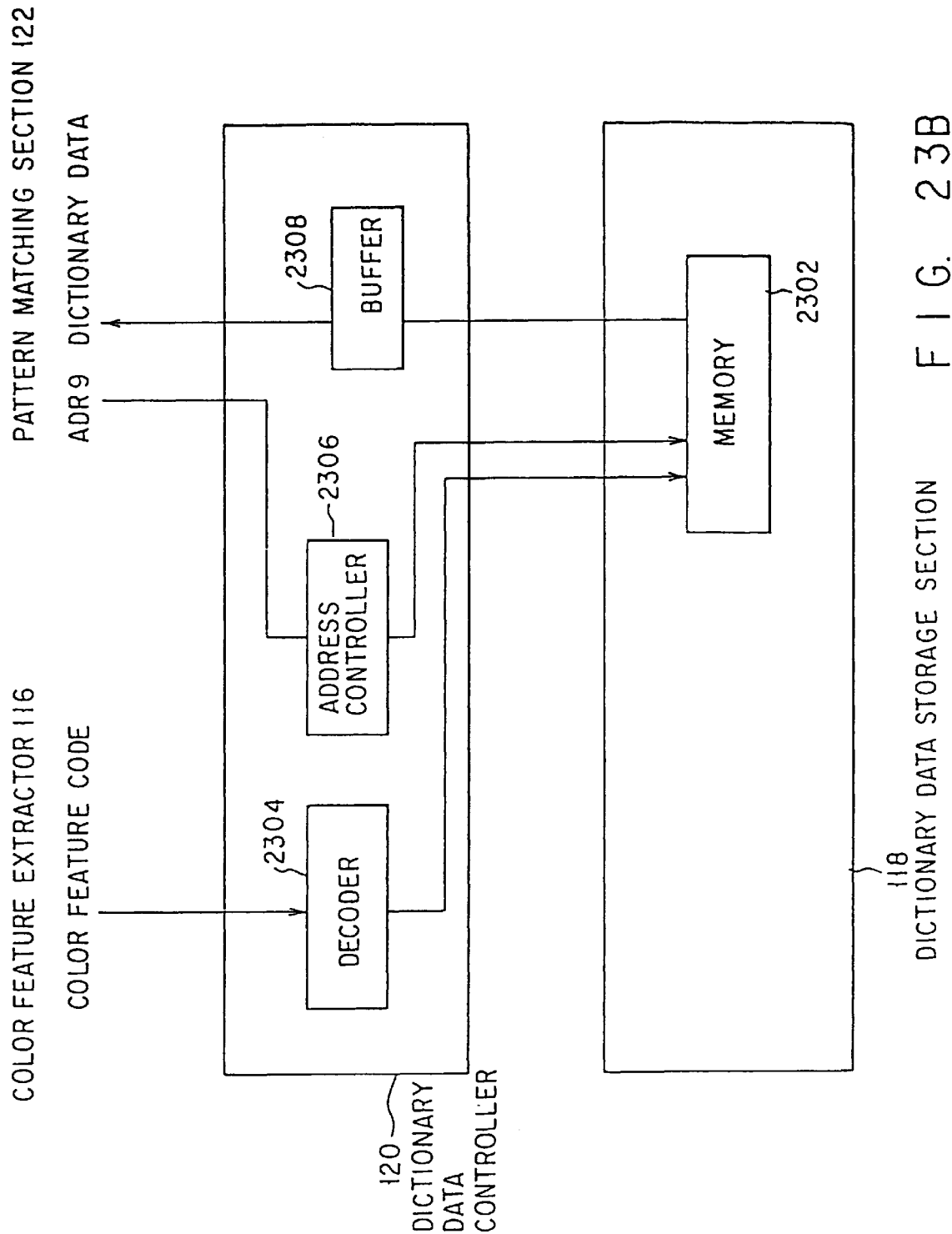
F I G. 23B

| | | | | | | | |
|---|---|---|---|---|---|---|---|
| 6 | 13 | 13 | 13 | 13 | 13 | 6 | |
| 9 | 17 | 21 | 26 | 31 | 30 | 17 | |
| 9 | 17 | 32 | 45 | 52 | 57 | 28 | |
| 10 | 24 | 35 | 42 | 66 | 81 | 28 | |
| 12 | 30 | 41 | 52 | 88 | 119 | 35 | V IMAGE |
| 14 | 32 | 45 | 55 | 91 | 125 | 30 | |
| 11 | 25 | 51 | 55 | 118 | 121 | 31 | |
| 11 | 27 | 44 | 45 | 59 | 63 | 23 | |
| 9 | 15 | 15 | 15 | 15 | 17 | 12 | |
| 6 | 13 | 13 | 13 | 13 | 13 | 6 | |
| 128 | 128 | 128 | 128 | 128 | 128 | 128 | |
| 128 | 131 | 131 | 131 | 128 | 115 | 129 | |
| 128 | 131 | 132 | 131 | 118 | 116 | 129 | |
| 128 | 131 | 132 | 132 | 117 | 117 | 129 | |
| 128 | 131 | 132 | 132 | 116 | 116 | 129 | C IMAGE |
| 128 | 129 | 130 | 127 | 115 | 115 | 129 | |
| 128 | 127 | 129 | 126 | 119 | 119 | 128 | |
| 128 | 126 | 126 | 126 | 121 | 121 | 128 | |
| 128 | 127 | 126 | 125 | 125 | 125 | 128 | |
| 128 | 128 | 128 | 128 | 128 | 128 | 128 | |
| 128 | 128 | 128 | 128 | 128 | 128 | 128 | |
| 128 | 128 | 129 | 129 | 129 | 135 | 126 | |
| 128 | 128 | 129 | 129 | 130 | 136 | 126 | |
| 128 | 129 | 129 | 135 | 136 | 137 | 126 | |
| 128 | 120 | 115 | 135 | 136 | 138 | 126 | d IMAGE |
| 128 | 120 | 109 | 107 | 131 | 137 | 128 | |
| 128 | 111 | 109 | 107 | 145 | 138 | 128 | |
| 128 | 111 | 110 | 128 | 137 | 135 | 128 | |
| 128 | 111 | 110 | 129 | 131 | 131 | 128 | |
| 128 | 128 | 128 | 128 | 128 | 128 | 128 | |

F I G. 24

| | | | | | | | |
|---|---|---|---|---|---|---|---|
| 7 | 15 | 15 | 15 | 15 | 15 | 7 | ⎫ |
| 10 | 18 | 23 | 27 | 33 | 32 | 18 | |
| 10 | 18 | 35 | 47 | 53 | 39 | 29 | |
| 11 | 26 | 38 | 45 | 70 | 83 | 29 | |
| 13 | 31 | 43 | 55 | 91 | 121 | 36 | V IMAGE |
| 15 | 33 | 48 | 57 | 96 | 127 | 37 | |
| 12 | 28 | 53 | 57 | 121 | 124 | 32 | |
| 12 | 29 | 46 | 48 | 61 | 65 | 32 | |
| 10 | 17 | 17 | 17 | 17 | 19 | 24 | |
| 7 | 15 | 15 | 15 | 15 | 15 | 7 | ⎭ |
| 128 | 128 | 128 | 128 | 128 | 128 | 128 | ⎫ |
| 128 | 133 | 141 | 129 | 129 | 129 | 128 | |
| 128 | 133 | 141 | 138 | 131 | 130 | 128 | |
| 128 | 132 | 138 | 142 | 137 | 129 | 128 | |
| 128 | 128 | 135 | 138 | 143 | 104 | 128 | C IMAGE |
| 128 | 125 | 128 | 135 | 129 | 105 | 128 | |
| 128 | 125 | 130 | 128 | 115 | 120 | 128 | |
| 128 | 126 | 136 | 137 | 120 | 115 | 128 | |
| 128 | 127 | 130 | 130 | 128 | 120 | 128 | |
| 128 | 128 | 128 | 128 | 128 | 128 | 128 | ⎭ |
| 128 | 128 | 128 | 128 | 128 | 128 | 128 | ⎫ |
| 128 | 130 | 130 | 135 | 129 | 130 | 128 | |
| 128 | 125 | 125 | 124 | 124 | 121 | 128 | |
| 128 | 120 | 118 | 109 | 131 | 121 | 128 | |
| 128 | 118 | 109 | 113 | 130 | 121 | 128 | d IMAGE |
| 128 | 109 | 112 | 111 | 131 | 121 | 128 | |
| 128 | 113 | 112 | 115 | 130 | 121 | 128 | |
| 128 | 111 | 115 | 128 | 131 | 121 | 128 | |
| 128 | 130 | 131 | 130 | 130 | 121 | 128 | |
| 128 | 128 | 128 | 128 | 128 | 128 | 128 | ⎭ |

F I G. 25

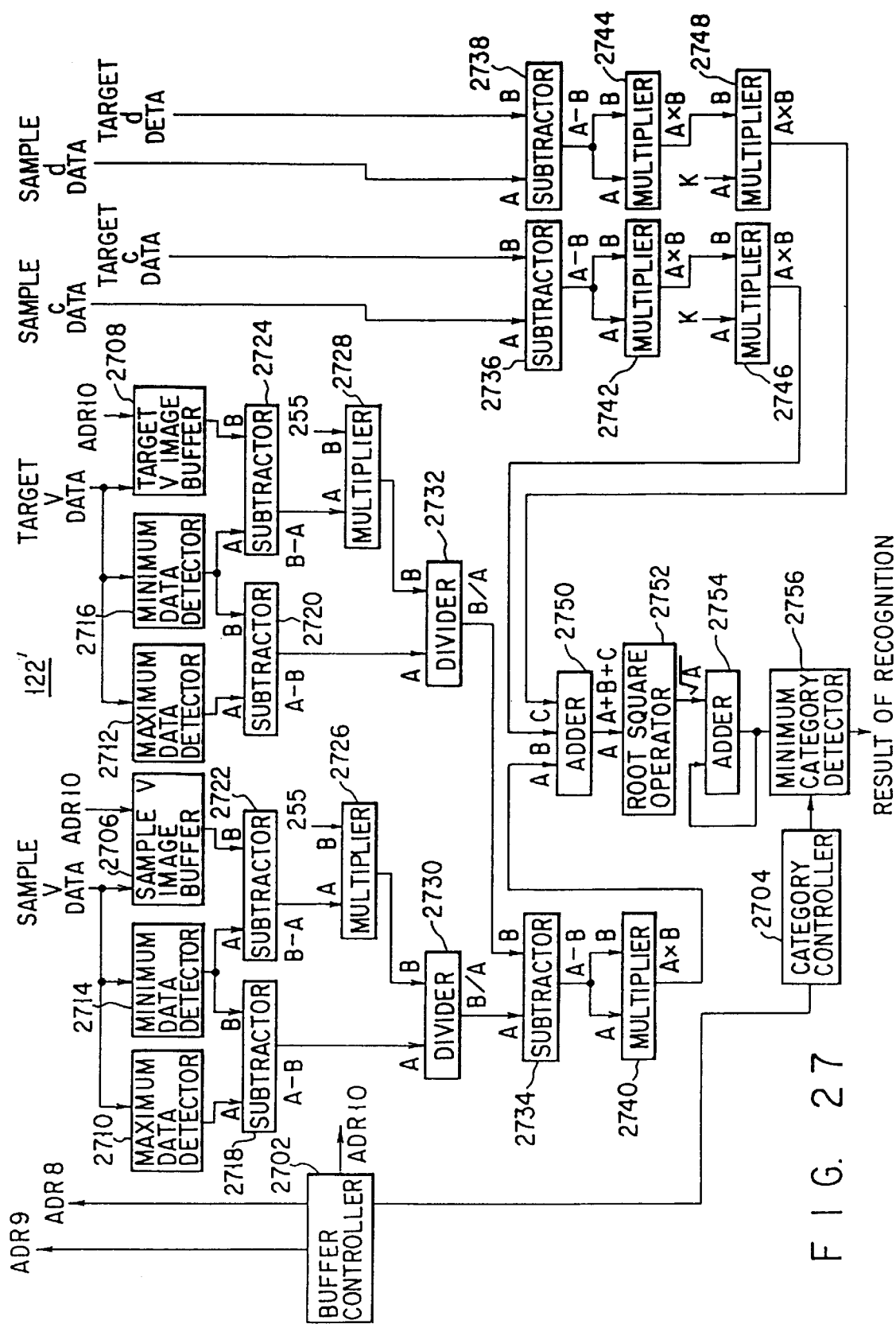
F I G. 27

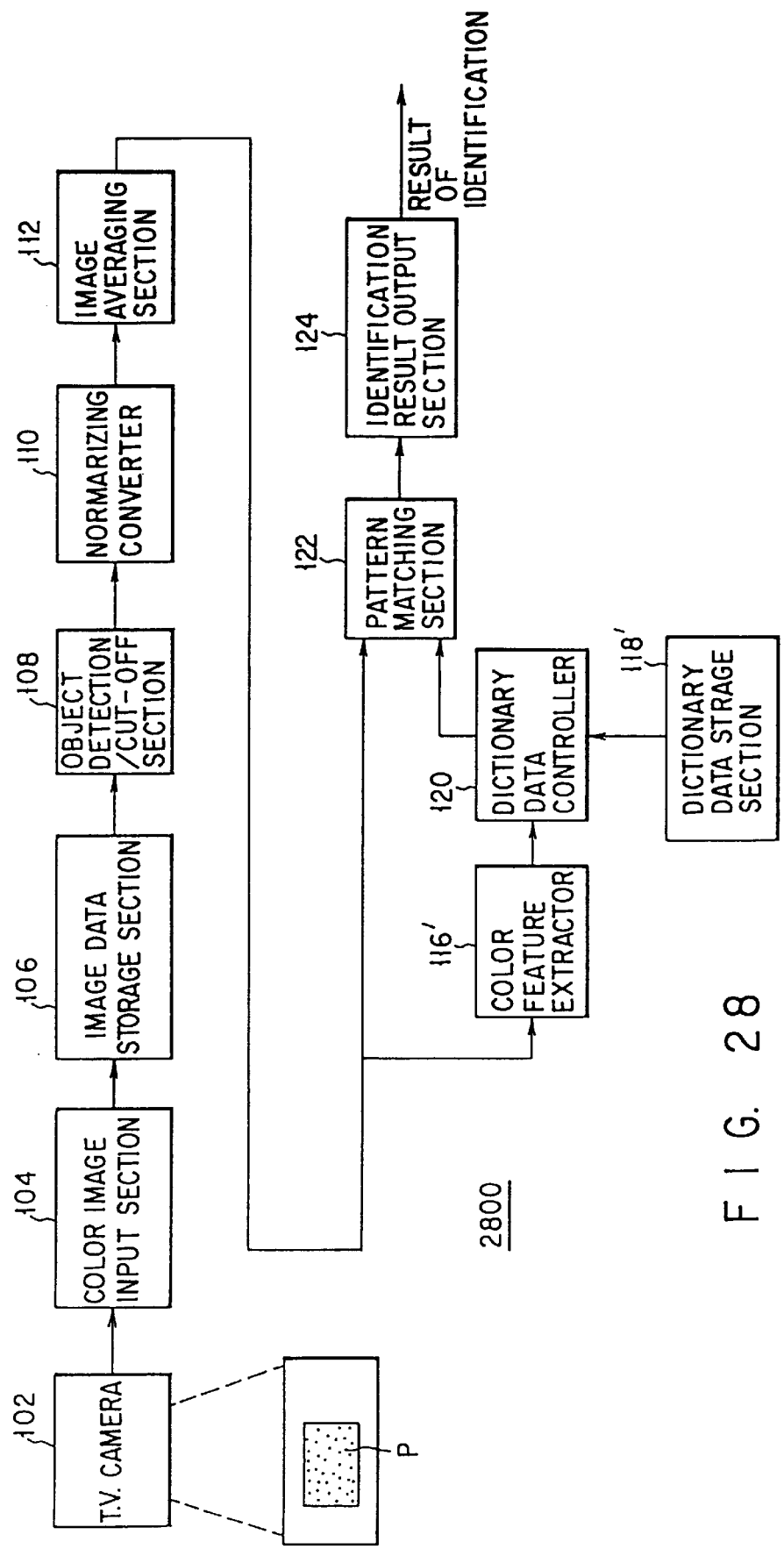
F I G. 28

CATEGORY 1
| CATEGORY 1-1 | R IMAGE |
| CATEGORY 1-1 | G IMAGE |
| CATEGORY 1-1 | B IMAGE |
| CATEGORY 1-2 | R IMAGE |
| CATEGORY 1-2 | G IMAGE |
| CATEGORY 1-2 | B IMAGE |

⋮

CATEGORY 2
| CATEGORY 2-1 | R IMAGE |
| CATEGORY 2-1 | G IMAGE |
| CATEGORY 2-1 | B IMAGE |
| CATEGORY 2-2 | R IMAGE |
| CATEGORY 2-2 | G IMAGE |
| CATEGORY 2-2 | B IMAGE |

⋮

CATEGORY 3

CATEGORY 4

⋮

CATEGORY 4
| CATEGORY 64-1 | R IMAGE |
| CATEGORY 64-1 | G IMAGE |
| CATEGORY 64-1 | B IMAGE |
| CATEGORY 64-2 | R IMAGE |
| CATEGORY 64-2 | G IMAGE |
| CATEGORY 64-2 | B IMAGE |

F I G. 31

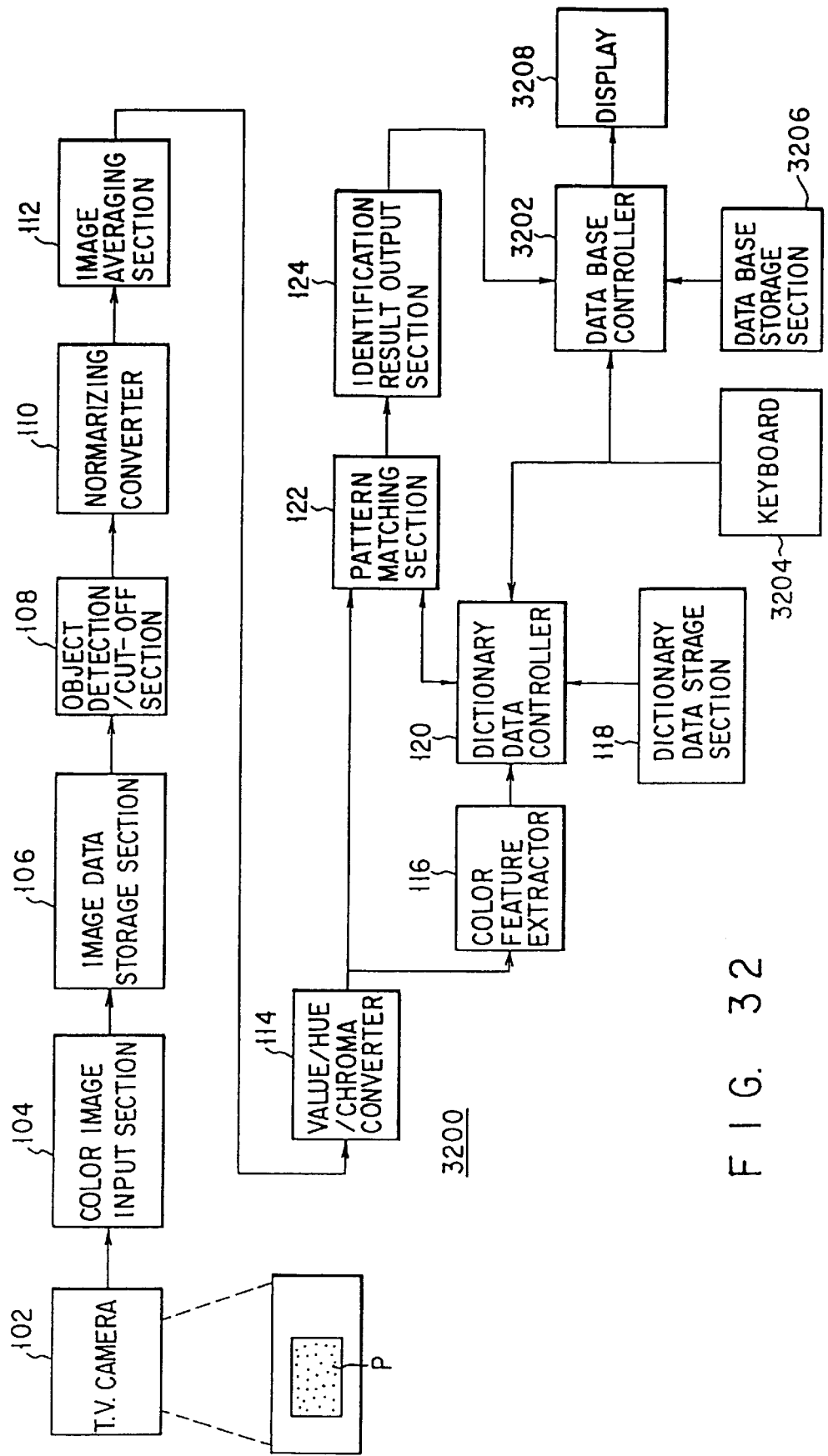
F I G. 3 2

| | |
|---|---|
| CATEGORY R-1 | ITALY |
| | ROME |
| | COLOSSEUM |
| | ⋮ |
| CATEGORY R-2 | JAPAN |
| | MATSUE-CITY |
| | SHINJI-KO |
| | ⋮ |
| CATEGORY B-5 | AUSTRALIA |
| | SYDNEY |
| | OPERA HOUSE |
| | ⋮ |
| CATEGORY NC-126 | U.S.A |
| | NEW YORK |
| | STATUE OF LIBERTY |
| | ⋮ |

FIG. 34

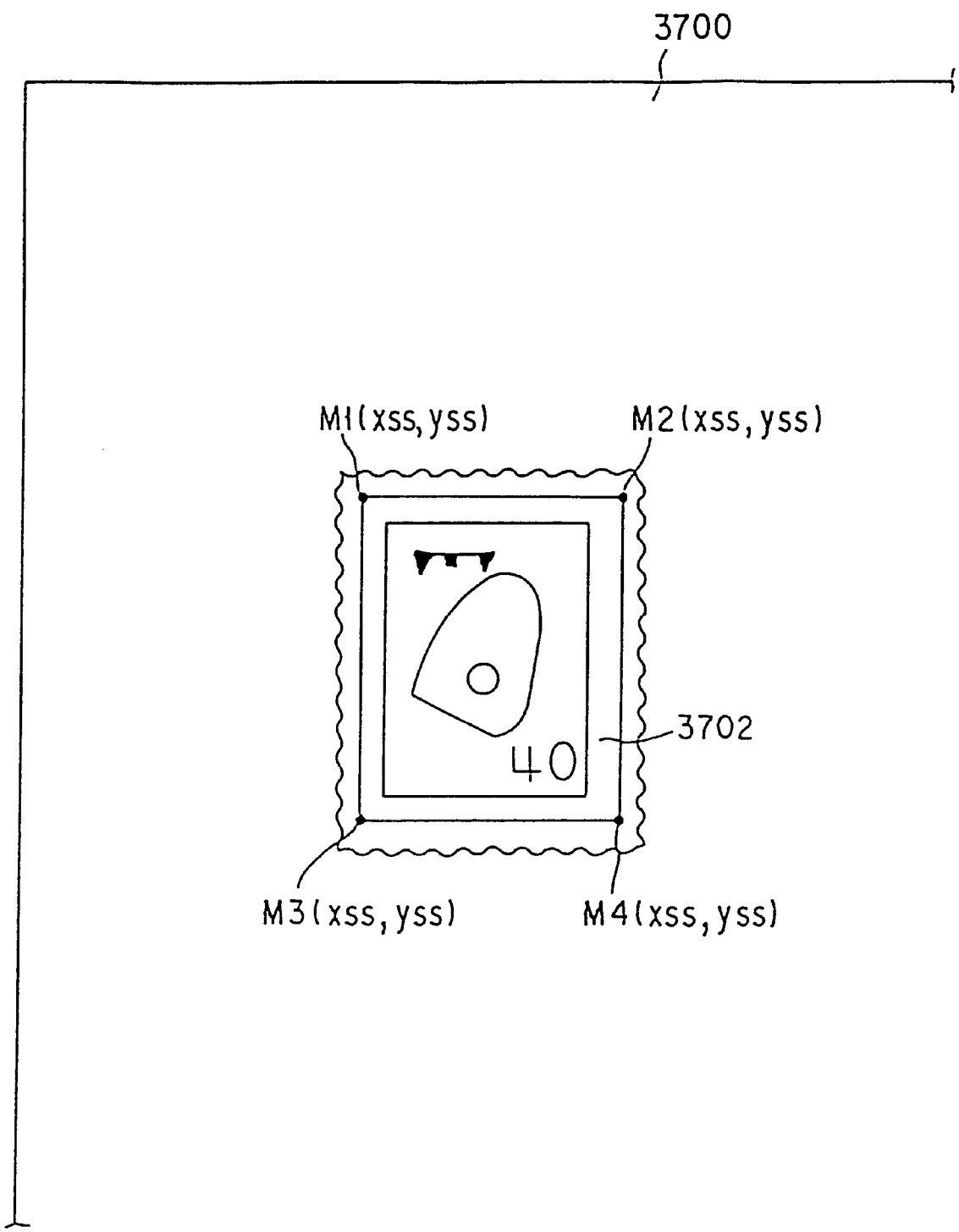
F I G. 37

FIG. 38

IMAGE IDENTIFYING APPARATUS

FIELD OF THE INVENTION

The invention relates in general to image identifying apparatus and, more particularly, to image identifying apparatus capable of identifying color images and patterns with precision and speed.

DESCRIPTION OF THE RELATED ART

Japanese Patent Application (TOKU-KAI-HEI) 04-54681 discloses a method for detecting and identifying a specific object from among unspecified objects using color images. This method includes preparing a frequency distribution pattern from color images and detecting and identifying a bank note by comparing the frequency distribution pattern with a reference pattern.

Japanese Patent Application (TOKU-GAN-HEI) 5-176962 discloses a method for identifying a color image by averaging its secondary pattern and comparing it with a standard pattern.

In conventional color image identifying methods, such as a identifying method which compares a frequency distribution pattern of a color image with reference patterns or an identifying method in which a color pattern is averaged and compared with standard patterns, it is necessary to make a comparison with all of the available registered standard patterns. Therefore, substantial time is required for making the comparison if there are a substantial number of standard patterns, so that it is difficult to make an identification at high speed.

SUMMARY OF THE INVENTION

Accordingly, the invention is directed to an image identifying apparatus that substantially obviates one or more of the problems due to limitations and disadvantages of the related art.

To achieve the advantages of the invention and in accordance with the purpose of the invention, as embodied and broadly described, the invention is directed to apparatus for identifying an image represented by digital image data. The apparatus includes means for extracting from the digital image data feature data corresponding to predetermined features of the image to be identified; a memory to store target image data representative of at least one target image; means, responsive to the extracting means, for retrieving from the memory target image data in accordance with the extracted feature data; and means for determining a similarity between the digital image data and the retrieved target image data.

Also in accordance with the present invention, there is provided apparatus for identifying an image represented by digital image data. The apparatus includes a first circuit, coupled to receive predetermined portions of the digital image data, to compute a category parameter representative of the predetermined portions; a memory to store target image data representative of at least one target image; a memory controller, coupled to the memory and to receive the category parameter, to retrieve from the memory target image data corresponding to the category parameter; and a second circuit, coupled to receive the digital image data and the retrieved target image data, to determine a similarity parameter representative of a similarity between the digital image data and target image data.

Further in accordance with the present, there is provided a method for identifying an image represented by digital image data. The method includes the steps of extracting from the digital image data predetermined features of the image to be identified; retrieving from a memory target image data representative of at least one target image, in accordance with the extracted predetermined features; and determining a similarity between the digital image data and the retrieved target image data.

BRIEF DESCRIPTION OF THE DRAWINGS

The accompanying drawings, which are incorporated in and constitute a part of the specification, illustrate embodiments of the invention and, together with the general description of the invention given above and the detailed description of the embodiments given below, serve to explain the objects, advantages, and principles of the invention.

FIG. 1 is a block diagram of an image identifying apparatus of a first embodiment of the invention.

FIG. 4 is a diagram of an example of the arrangement of one color component data of the color image data stored in the image data storage section.

FIG. 8 is a diagram of an example of the arrangement of one color component data of color image data converted to a fixed size.

FIG. 9 is a diagram of the arrangement of data stored in a normalizing converter as a processed result.

FIG. 11 is a diagram of 70 sample point pixels sampled by an image averaging section.

FIG. 12 is a diagram of neighborhood pixel weighing factors used by the image averaging section.

FIG. 13 is a diagram of an example of the processed result output from the image averaging section.

FIG. 14 is a diagram of an example of the arrangement of averaged input data stored in the image averaging section.

FIG. 16 is a conceptual graphical representation of vulue/hue/chromvalues that are converted by a value/hue/chroma converter.

FIG. 17 is an illustration of a neural network for conversion of RGB values.

FIG. 23A illustrates an example of a data format used in a dictionary data storage section.

FIG. 23B is a block diagram of a dictionary data controller and the dictionary data storage section.

FIG. 24 is a diagram of an example of a color image recognized by a pattern matching section.

FIG. 25 is a diagram of an example of one category of dictionary data used in the pattern matching section.

FIG. 27 is a block diagram showing an alternate construction of the pattern matching section.

FIG. 28 is a block diagram of an image identifying apparatus of a second embodiment of the invention.

FIG. 31 is a diagram of an example of the arrangement of data stored in the dictionary data storage section in the second embodiment.

FIG. 32 is a block diagram of an image identifying apparatus of a third embodiment of the invention.

FIG. 34 is a diagram of an example of the arrangement of data stored in a data base of the third embodiment.

FIG. 37 is an illustration of an example of a postal stamp to be identified.

FIG. 38 illustrates an example of a data format used in a dictionary data storage section of the fourth embodiment.

DETAILED DESCRIPTION OF THE PREFERRED EMBODIMENTS

Figure 2:
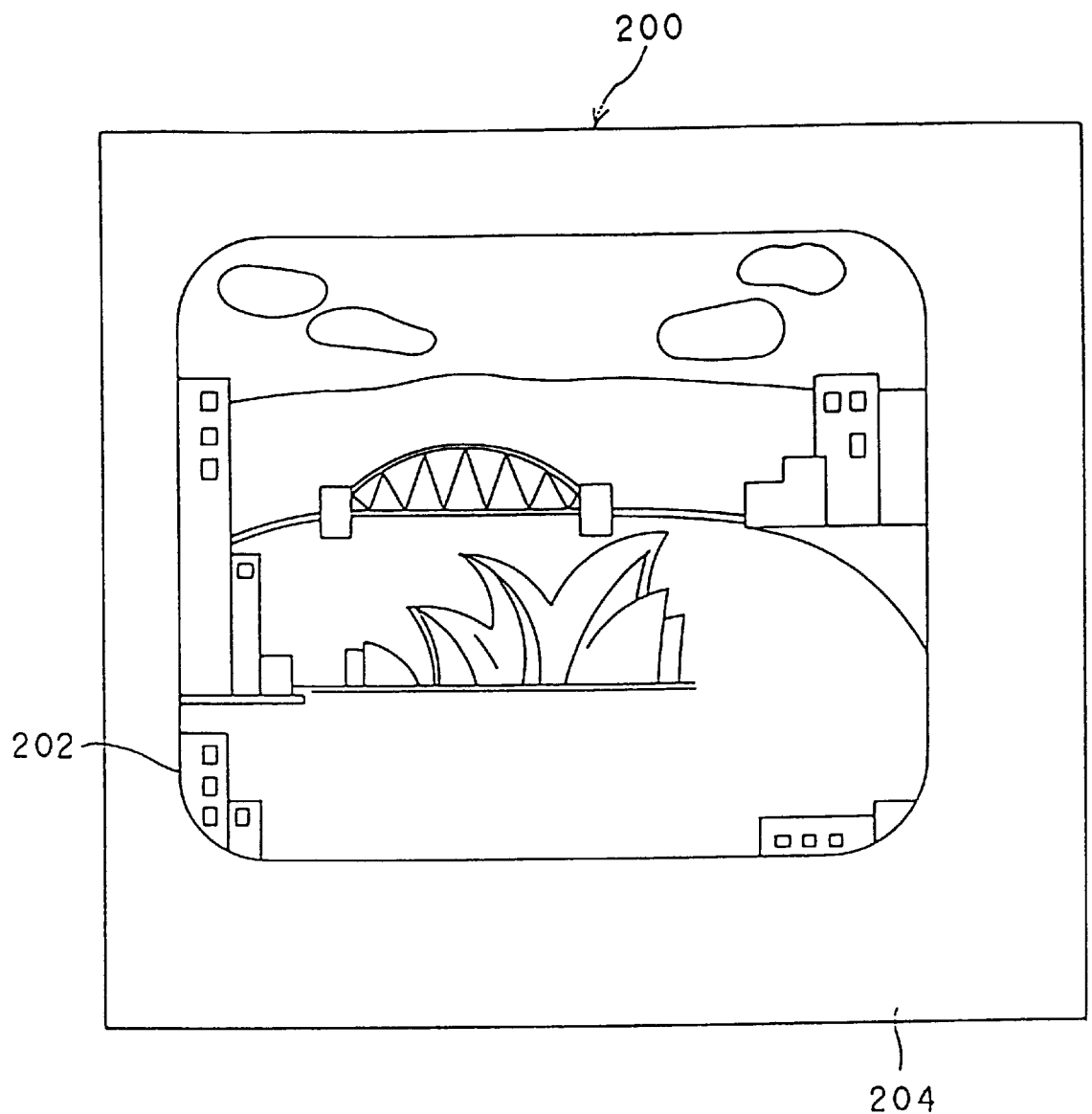
FIG. 2 is an illustration of an example of an object to be picked up by a color image input section.

Hereinafter, preferred embodiments of the invention will be described with reference to the drawings. FIG. 1 is a block diagram showing the construction of an image identifying apparatus 100 of a first embodiment of the present invention. Apparatus 100 includes a color television camera ("TV camera") 102 for providing an analog signal representing a color image of an object P to be identified, a color image input section 104 coupled to receive the analog image signal from TV camera 102, and an image data storage section 106 coupled to an output of input section 104. Apparatus 100 also includes an object detection/cut-off section 108 coupled to an output of storage section 106, a normalizing converter 110 coupled to an output of section 108, and an image averaging section 112 coupled to an output of section 110. Apparatus 100 further includes a value/hue/chroma converter 114 coupled to an output of section 112, a color feature extractor 116 coupled to an output of converter 114, and a dictionary data storage section 118 for storing reference data coupled to an output of a dictionary data controller 120. Controller 120 of apparatus 100 is coupled to an output of extractor 116 and to section 118 to perform read, write and control functions with respect to section 118. Apparatus 100 also includes a pattern matching section 122 for performing comparing and discriminating functions, which is coupled to outputs of both of converter 114 and controller 120. Further, an identification result output section 124 is coupled to an output of section 122.

FIG. 2 illustrates an object to be identified. For example, included in an overall image 200 is a scene image 202 printed in at least two color components mounted on a background 204, for example, a white, shaded, or black background.

Next, the various elements of image identifying apparatus 100 are described in detail.

Figure 3:
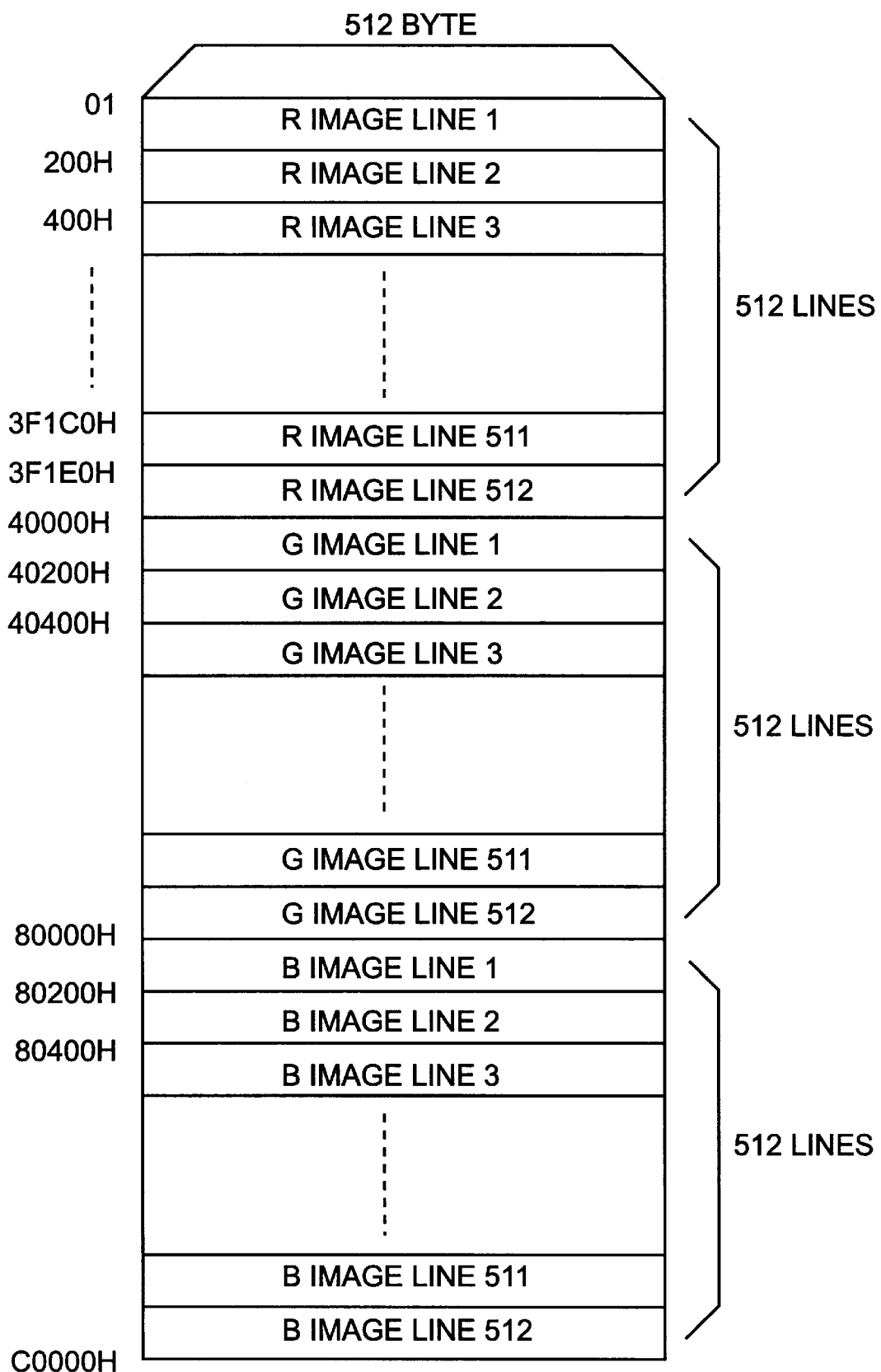
FIG. 3 is a diagram of an example of the arrangement of color image data stored in an image data storage section.

A color image of the object P (FIG. 1), such as scene image 202 to be identified and a portion of the overall image 200 within which the object P is included, is imaged by TV camera 102, which provides an analog image signal of the color image to color image input section 104. Section 104 includes conventional circuitry for digitizing the image signal and provides digital color image data corresponding to the analog image signal to image data storage section 106 for storage. In this embodiment, storage section 106 is a RAM, and the digitized color image is stored in image data storage section 106 in a memory arrangement of, for example, 512 pixels in the horizontal image direction and 512 pixels in the vertical image direction as R (red), G (green) and B (blue) images ("RGB image") in one byte per pixel per R, G, and B image. FIG. 3 illustrates an example of the format of the R, G, and B data stored in section 106.

Object detection/cut-off section 108 determines the extent of an object to be identified within an overall image, from the ROB image data stored in image data storage section 106. Object detection/cut-off section 108 performs this function by computing cumulative data for the pixels of a binary image in the vertical and horizontal directions. For example, section 108 executes a thresholding process using a fixed threshold value THR (e.g., 5) for one color component. FIG. 4 illustrates an example of the image data of the G component of the RGB image data stored in the form illustrated in FIG. 3.

Figure 5:
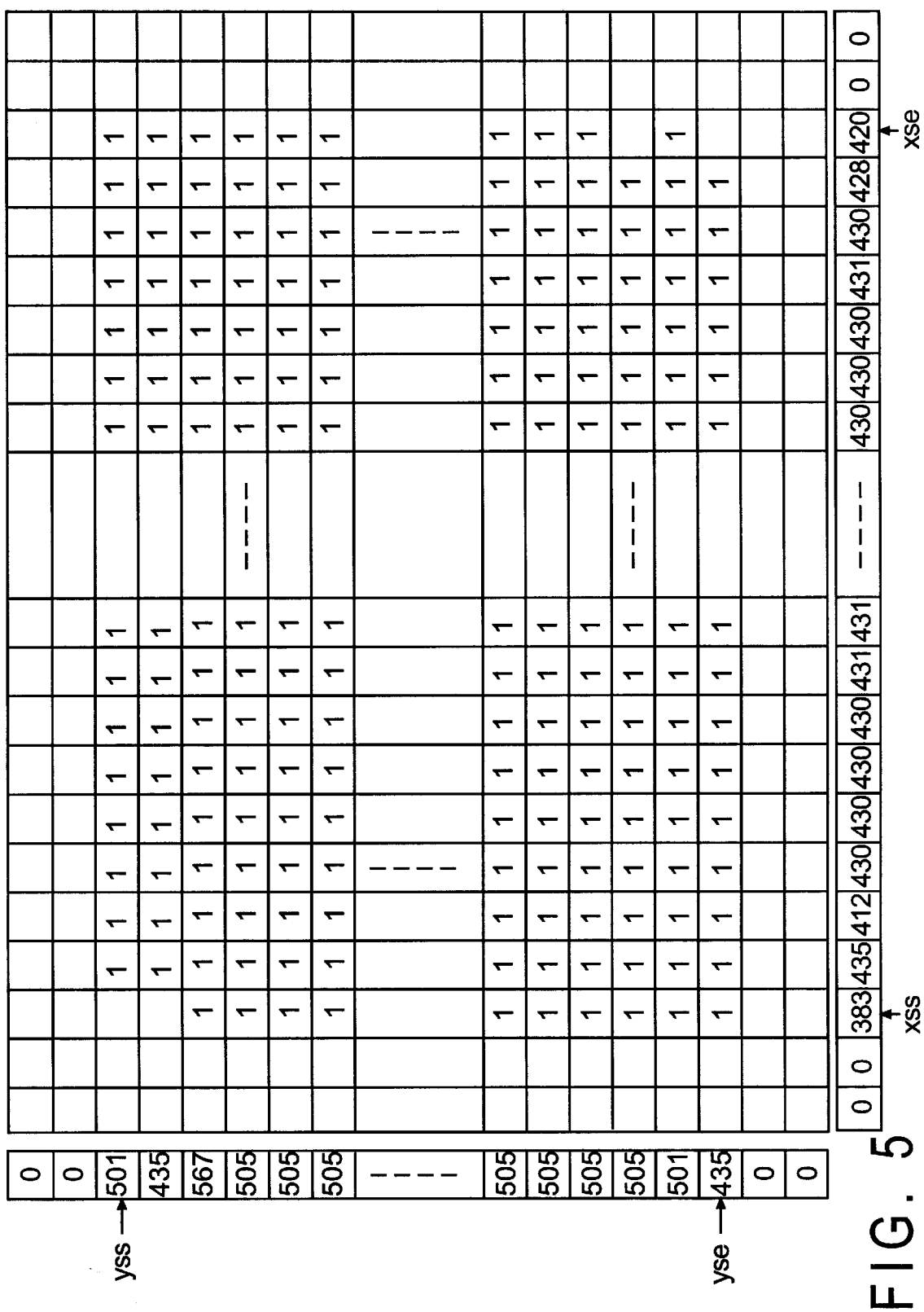
FIG. 5 is a diagram of an example of data arrangement for determining the position of an object to be recognized by an object detection/cut-off section and cumulative image data in the vertical and horizontal directions.
Figure 6:
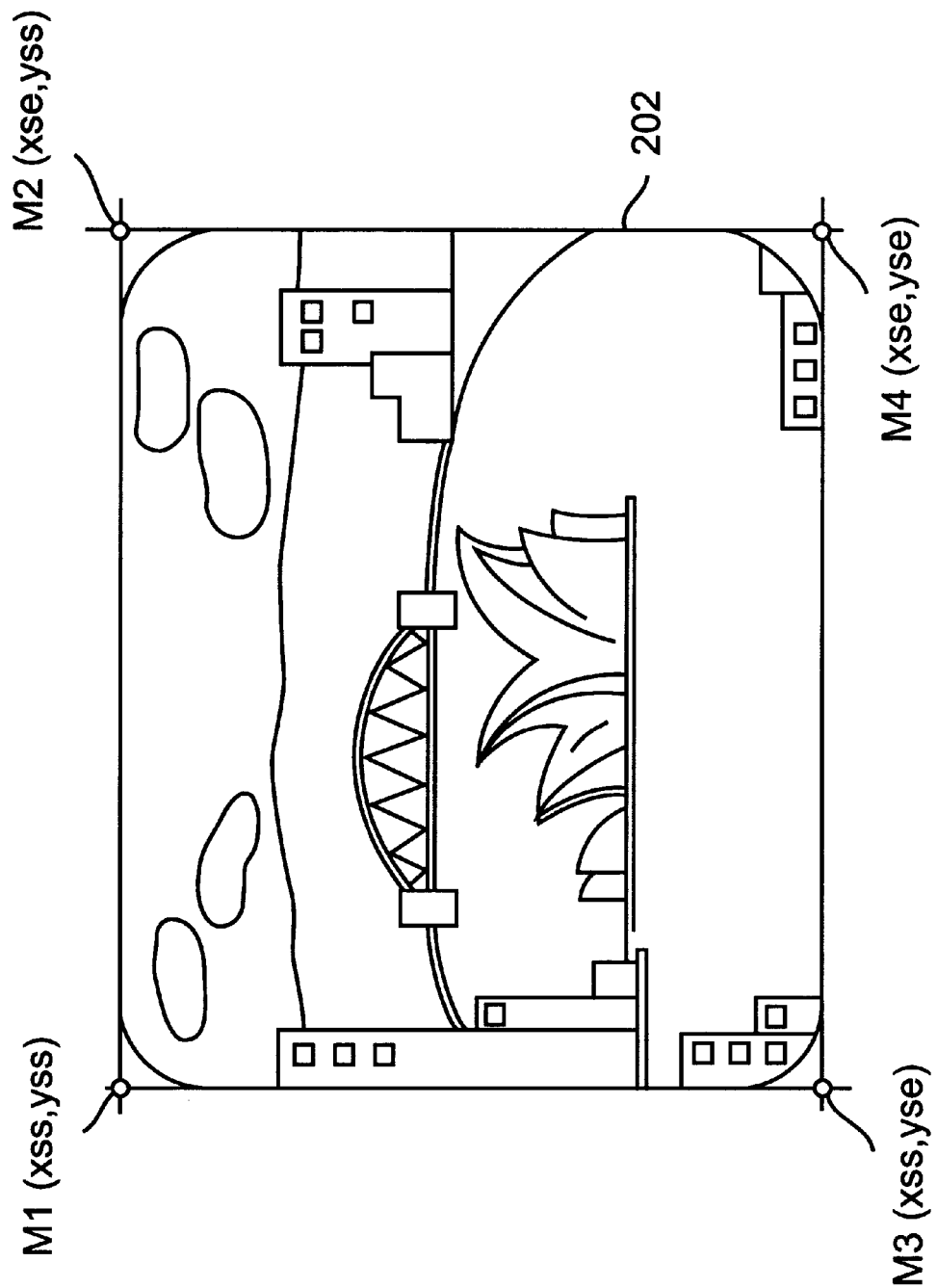
FIG. 6 is an illustration showing identification of four corners of an object to be recognized.

FIG. 5 illustrates an example of the data computed by the thresholding process when performed on the G component data illustrated in FIG. 4. As illustrated in FIG. 5, section 108 computers a "1" or "0" bit for each pixel of the G component image data depending on whether the G component for that pixel is or is not greater than THR. Cumulative data representing the number of "1" bits in each row and column of pixels is determined. Such cumulative data is shown in FIG. 5 below and to the left of the thresholding process results. By obtaining the connection starting points and terminating points of the cumulative data, which are not "0", i.e., xss, xse, yss and yse (shown in FIG. 5) in the vertical and horizontal directions, respectively, the object detection/cut-off section 108 obtains coordinate data of four corners M1, M2, M3 and M4 of the object to be identified. In particular, M1 corresponds to (xss, yss), M2 corresponds to (xse, yss), M3 corresponds to (xss, yse), and M4 corresponds to (xse, yse). FIG. 6 illustrates these four corners determined by section 108 for scene image 202.

Figure 7:
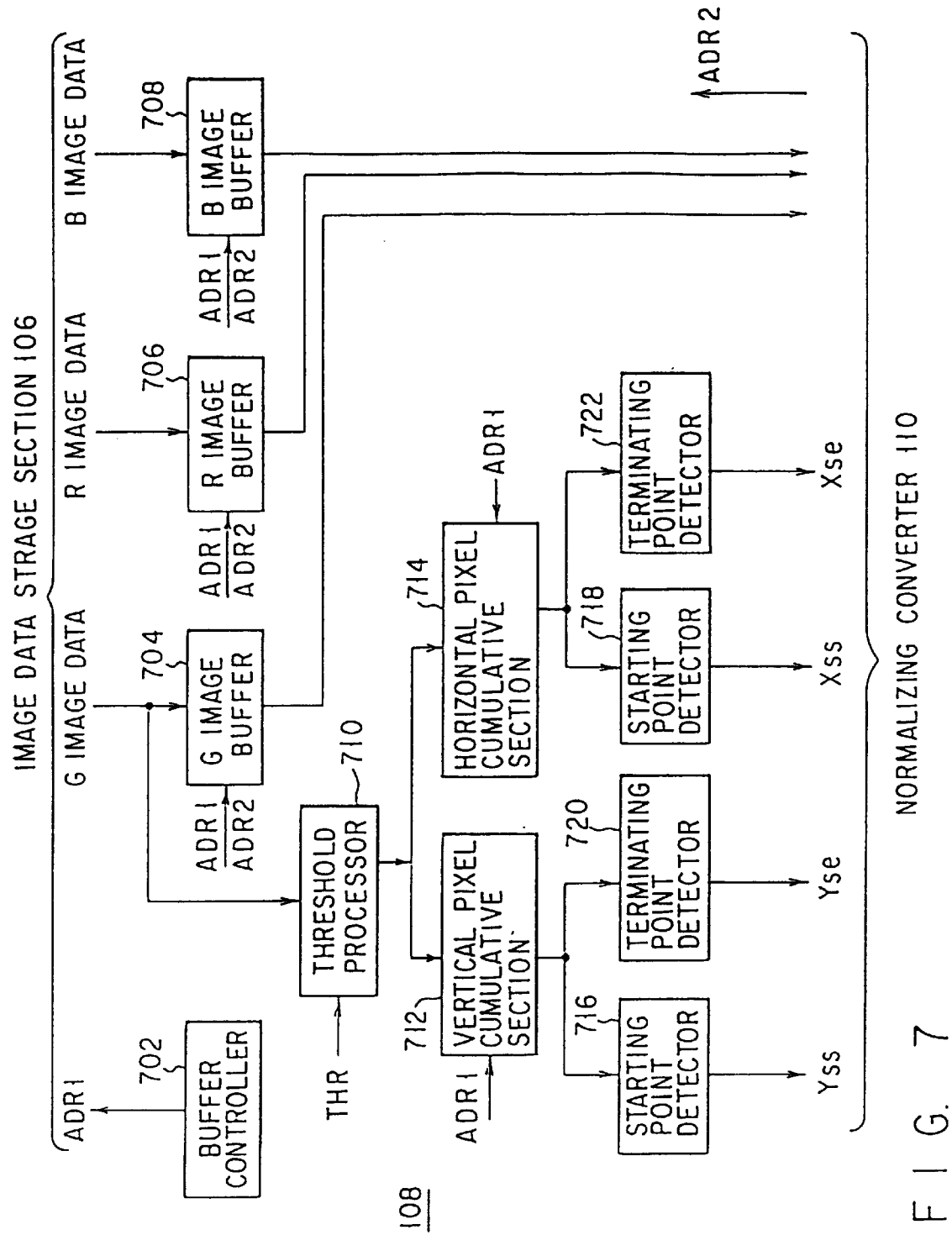
FIG. 7 is a block diagram of the object detection/cut-off section.

FIG. 7 illustrates a block diagram of a construction of the object detection/cut-off section 108. An RGB image is read from the image storage section 106 according to an address signal ADR1 that is output by a buffer controller 702, and the respective R, G, and B components are written into an R image buffer 704, a G image buffer 706, and a B image buffer 708. At the same time, a threshold processor 710 sets at "1" only pixels which have a value above THR for a G image. A vertical pixel cumulative section 712 and a horizontal pixel cumulative section 714 each comprise a counter selected by the address signal ADR1. The count value of each section 712 and 714 is increased by one in each case of a pixel value "1" for the vertical and horizontal addresses of each column and row of pixels, respectively.

Upon completion of the thresholding process of the entire image, starting point detectors 716 and 718 and terminating point detectors 720 and 722 detect both ends of the count values of the vertical pixel cumulative section 712 and the horizontal pixel cumulative section 714, which are other than 0, and obtain the connection starting and terminating points xss, xse, yss and yse at the four corners (M1, M2, M3, M4) of the image to be identified.

Use of the G component image data for processing in section 108 is preferred because the G component is close to the center of the visible spectrum and, therefore, is more representative of intensity data. Those skilled in the art will recognize that the use of a different component or characteristic of the image data from processing in section 108 may be suitable as a function of the type of image to be identified.

Using the coordinate data of the four corners M1, M2, M3, and M4 of the image to be identified, which have been detected by the object detection/cut-off section 108, the normalizing converter 110 normalizes sizes of image data within a range defined by the four corners. For example, to normalize a color image of hr(x,y), hg(x,y) and hb(x,y) of an image to be identified, which has been received from section 108, to an image of mr(x,y), mg(x,y) and mb(x,y) in arbitrarily defined vertical xst pixels and horizontal yst pixels, conversions defined in the following set of equations (1) are executed:

$$mr((x-xss)*xst/(xse-xss+1), (y-yss)*yst/(yse-yss+1))=hr(x, y)$$
$$mg((x-xss)*xst/(xse-xss+1), (y-yss)*yst/(yse-yss+1))=hg(x, y) \quad (1)$$
$$mb((x-xss)*xst/(xse-xss+1), (y-yss)*yst/(yse-yss+1))=hb(x, y)$$

wherein, x and y are integer values of the coordinates of the normalized image, $xss \leq x \leq xse$, and $yss \leq y \leq yse$.
Results of the normalizing operations made on respective coordinates are provided as integers.

FIG. 8 illustrates data resulting from normalizing the G color component data shown in FIG. 4. The data in FIG. 8 is based on the coordinate data xss, xse, yss and yse of the image to be identified, determined by object detection/cut-off section 108, when image data of the G color component illustrated in FIG. 4 is normalized for yst=28 and xst=19. The normalizing process is executed for each of the three component images of R, G, and B image data and stored in the normalizing converter 110 in a data format such as that illustrated in FIG. 9.

Figure 10:
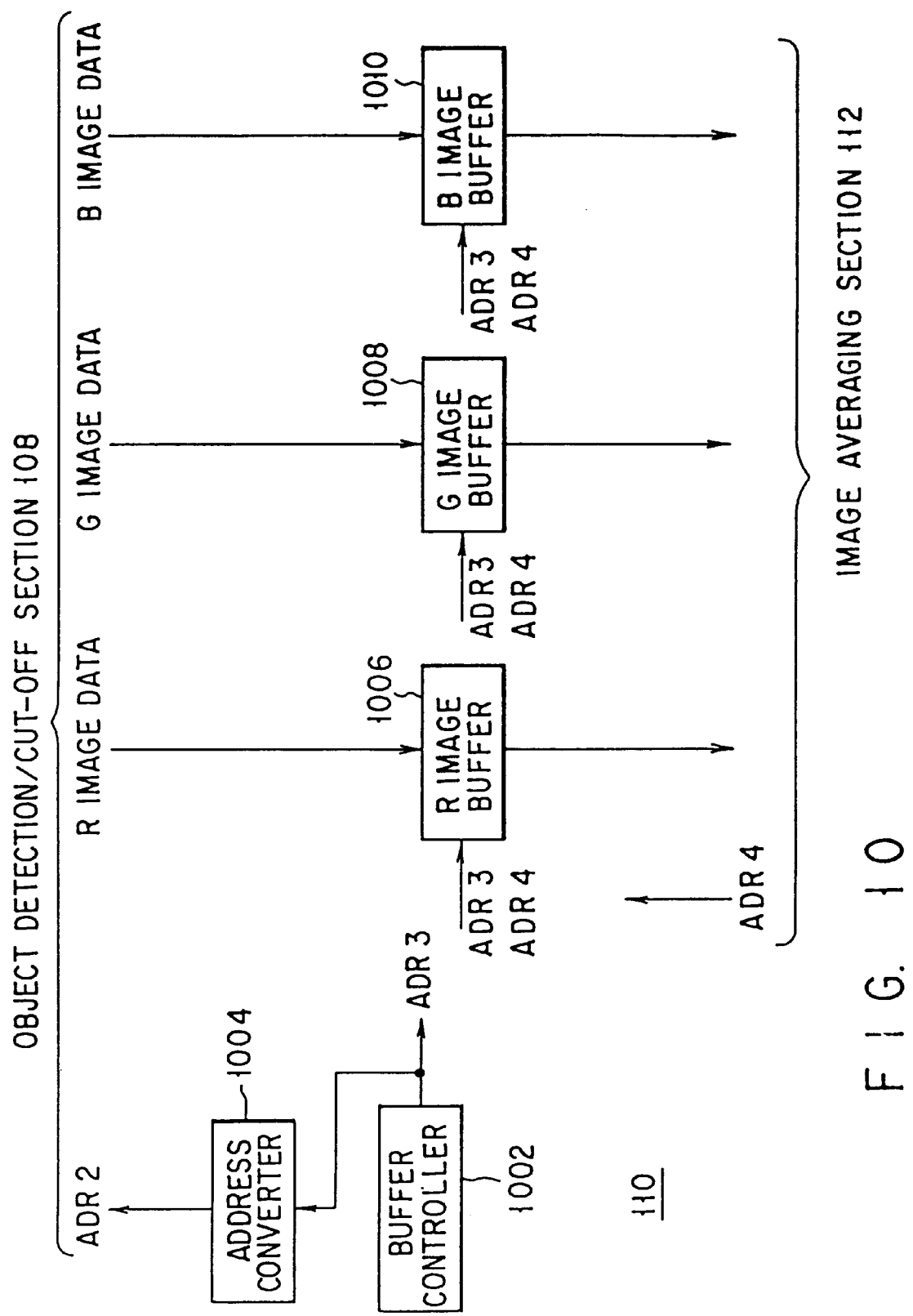
FIG. 10 is a block diagram of the normalizing converter.

FIG. 10 illustrates a block diagram of a construction of the normalizing converter 110. Normalizing converter 110 includes a buffer controller 1002 that outputs an address signal ADR3. An address converter 1004 converts signal ADR3 into an address signal ADR2, which designates x and y in equation (1) described above. Signal ADR2 is applied to buffers 704, 706, and 708 of section 108 to retrieve the image data stored in those buffers. The retrieved image data is written into an R image buffer 1006, a G image buffer 1008, and a B image buffer 1010, respectively, as designated by the new address signal ADR3 while reading RGB image data equivalent to that address from buffers 704, 706, and 708.

Figure 11:
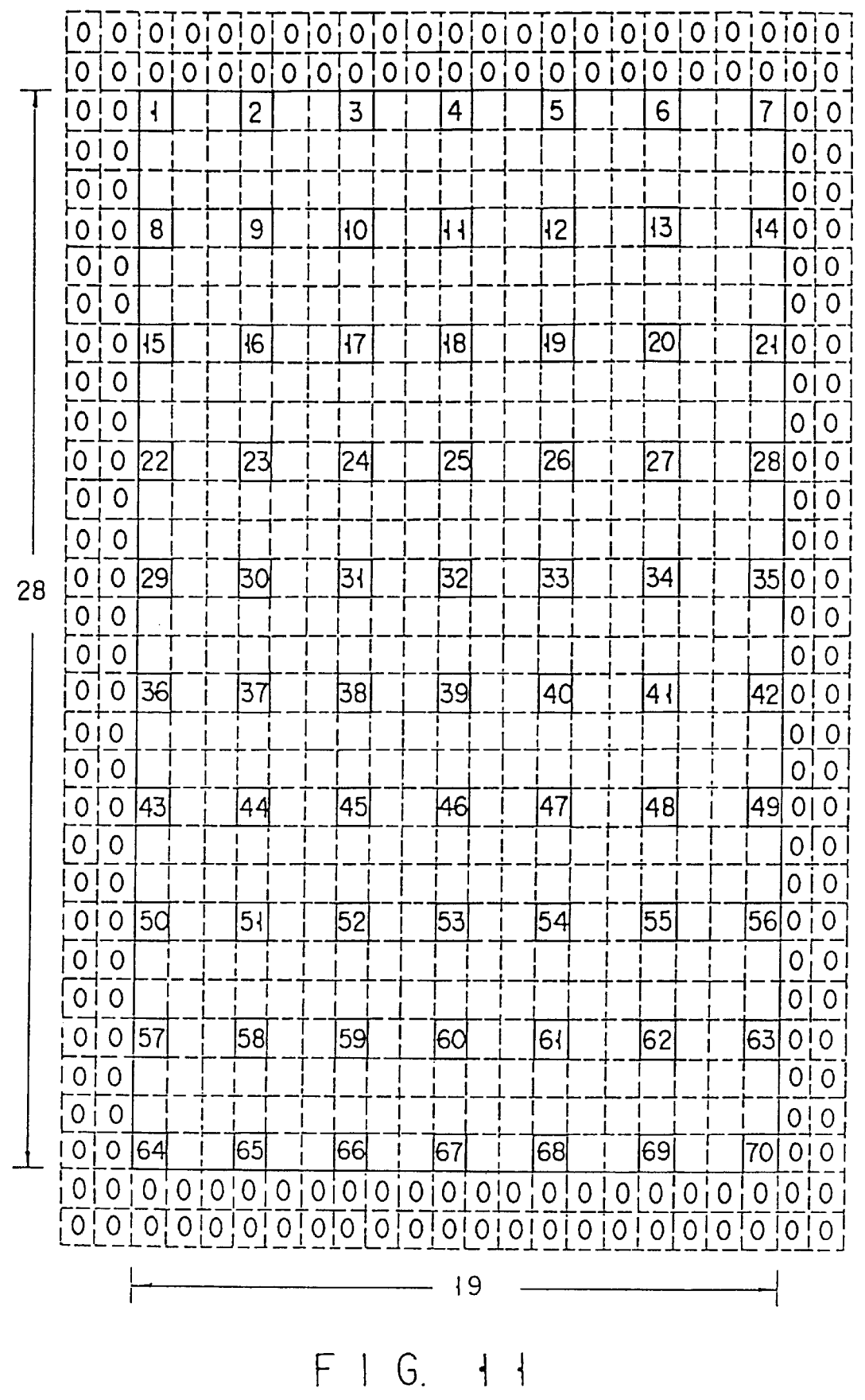

Next, in the image averaging section 112, the RGB image normalized in normalizing converter 110 and stored in buffers 1006, 1008 and 1010 is converted into an RGB image having a shaded pixel averaged construction. More particularly, FIG. 11 illustrates the selection of 70 sample pixels, numbered 1–70 among the pixels for which data is stored in buffers 1006, 1008, and 1010. A weighted neighborhood average pixel value will be computed for the sample pixels. FIG. 12 illustrates an exemplary neighborhood of 5×5 pixels for one of the 70 sample pixels and the weighing factors applied to the values of the pixels in the neighborhood. The result of this averaging process is to compute the pixel value of an averaged image of 7 horizontal pixels and 10 vertical pixels consisting only of the computed weighted neighborhood average values of the 70 sample pixels.

At this time, although the areas outside the image sample data provided by normalizing converter 110 are included in the range for averaging, data for peripheral pixels at the periphery of the image area in FIG. 11 are calculated using a pixel value "0" for the areas outside the image area. Also, for each of the 70 sample pixels, after a total weighted sum of the pixels in the 5×5 neighborhood is computed, the sum is divided by 18, which is the sum of the weighing factors shown in FIG. 12. FIG. 13 illustrates the averaged image data resulting from this averaging process for the sample pixel values shown in FIG. 8. The averaged image data is computed for the image data stored in section 110 for each of the RGB colors. FIG. 14 illustrates an example of the averaged image data for each of the RGB colors stored in image averaging section 112.

Figure 15:
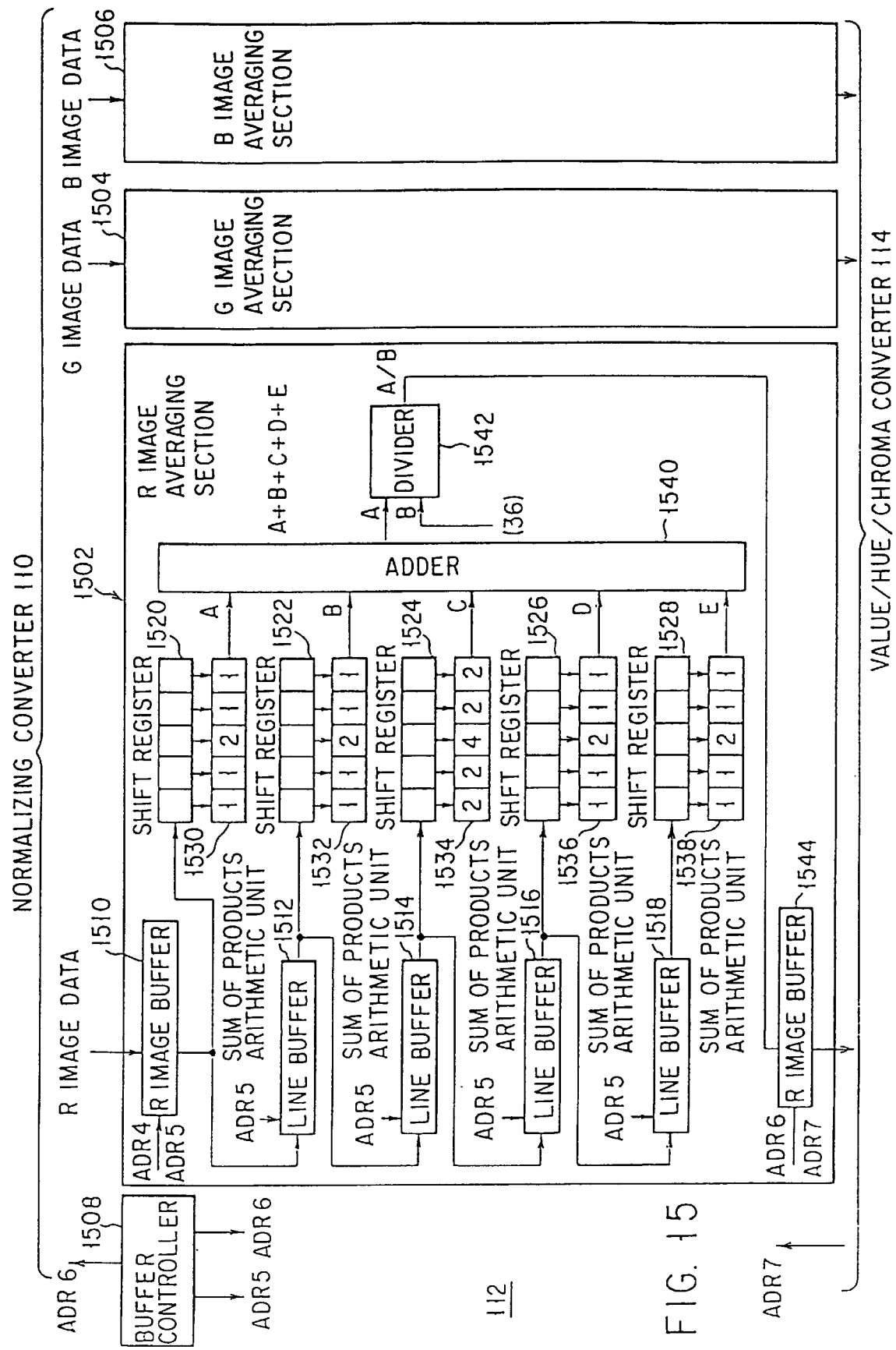
FIG. 15 is a block diagram of the image averaging section.

FIG. 15 illustrates a block diagram of a construction of image averaging section 112. Image averaging section 112 includes three processors: an R image averaging processor 1502, a G image averaging processor 1504, and a B image averaging processor 1506. Since these three processors have substantially the same construction, only the construction of R image averaging processor 1502 is described in detail. With reference to FIG. 15, processor 1502 includes a buffer controller 1508 that generates address signals ADR4, ADR5, and ADR6. A normalized R image is read from R image buffer 1006 of normalizing converter 110 by the address signal ADR4. Processor 1502 includes an R image buffer 1510 into which is written R image data read from buffer 1006. At this time, the normalized P image is stored in buffer 1510 in such a form that peripheral pixels are set at "0" as illustrated in FIG. 11.

Processor 1502 also includes line buffers 1512, 1514, 1516, and 1518, which are connected in sequence to enable shifting pixel data from one line buffer to the next. Each line buffer is coupled to receive the address signal ADR5. Shift registers 1520, 1522, 1524, 1526, and 1528 are respectively connected to receive pixel image data stored in image buffer 1510 and line buffers 1512–1518, respectively. Each shift register can store pixel image data of five pixels. Sum-of-product arithmetic units 1530, 1532, 1534, 1536, and 1538 are respectively connected to receive pixel image data stored in shift registers 1520–1528, respectively. Each sum-of-products arithmetic unit is configured to multiply the pixel image data of the five pixels stored by the corresponding shift register by the neighborhood weighing factors illustrated in FIG. 12 and compute a sum of the products. In FIG. 15, the weighing factors of one row of pixels in a pixel neighborhood as applied by each sum-of-products arithmetic unit are shown. These weighing factors have the same relative proportions as those shown in FIG. 12 but are expressed as whole numbers. Thus, for example, unit 1534 applies the factors of the center row of the pixel neighborhood.

An adder 1540 is connected to receive the sums respectively computed by units 1530–1538 and to add these sums to provide a sum A. A divider 1542 is connected to receive sum A and divide it by a value B equal to 36, which is the sum of the whole number weighing factors applied by units 1530–1538. An R image buffer 1544 is connected to receive the quotient A/B and stores it at an address specified by address signal ADR6. The address signals ADR6 correspond to the 70 sample pixels shown in FIG. 11.

In the operation of image averaging section 112, buffer controller 1508 generates address signals ADR5 to retrieve from R image buffer 1510 pixel image data for pixels in the neighborhood of one of the 70 sample pixels in FIG. 11. This neighborhood pixel data is transferred via buffer 1510 and line buffers 1512–1518 into shift registers 1520–1528, so that the shift registers store the image data for the 5×5 pixels of the neighborhood for one of the sample pixels. Then units 1530–1538, adder 1540, and divider 1542 compute the average pixel value for the particular sample pixel. The result is stored in buffer 1544 as a pixel of the averaged image in accordance with address signal ADR7.

It is noted that since image averaging section 112 can process image data in real time, image buffer 1510 is not required and image data as read from converter 110 can be directly processed in section 112.

In value/hue/chroma converter 114, averaged image data comprising 7 vertical pixels and 10 horizontal pixels for each R, G, and B color is converted to values based on orthogonal coordinates indicating H (hue), v (value) and C (chroma) values ("HVC values") of the corrected Munsell system, which are widely used to represent human color perception. More particularly, color data is expressed by three values V, c and d ("Vcd value"), where V is the value component of the Munsell system, and c and d are arbitrarily defined. With reference to FIG. 16, each HVC value can be represented in polar-coordinate form on the hue(H)/chroma (C) surface. As a result, the values c and d are defined by converting an HC value in polar coordinates on the hue/chroma surface into values c and d using equation (2):

$$c = \cos H \times C + 128$$

$$d = \sin H \times C + 128 \quad (2)$$

In equation (2), the value 128 is added to the result to assure a positive result that can be represented by 8 bit data. This conversion of RGB values into vcd values can be accomplished by using, for example, a neural network. As diagrammatically illustrated in FIG. 17, such a neural network is composed of an input layers, an output layer, and an intermediate layer. The RGB values are received by the input layer and the Vcd values are provided by the output layer.

In order to determine weight factors to be used in the respective units of the layers of the neural network, a study was made using a three layer neural network comprising seventeen units of an intermediate layer, three units of an input layer corresponding to R, G, and B colors, and three units of an output layer corresponding to V, c, and d values.

Figures 18, 19:
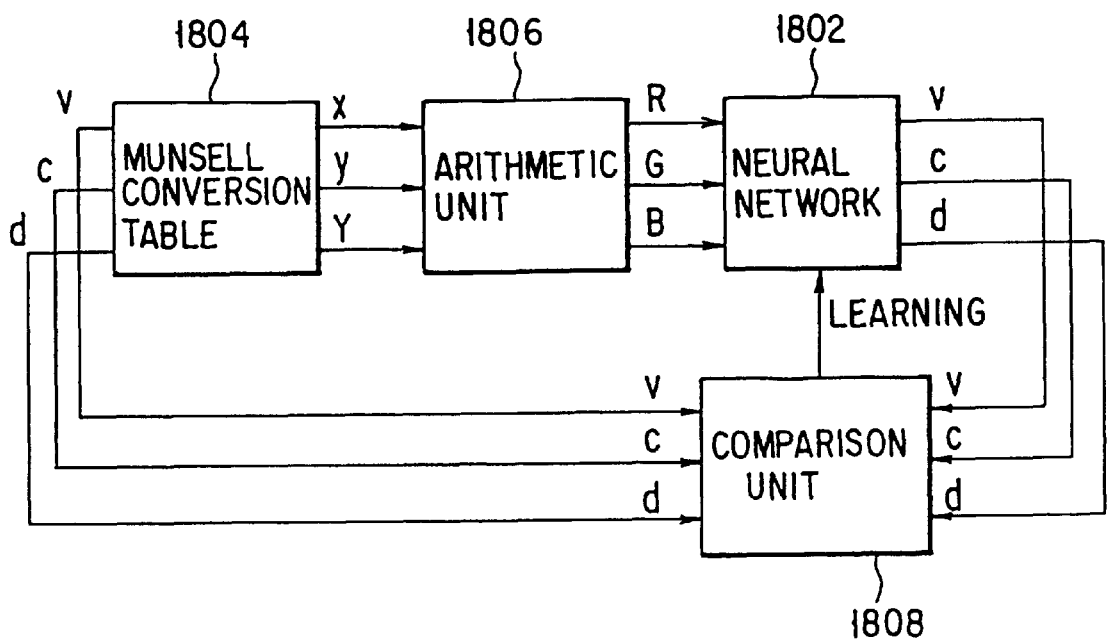
FIG. 18 is an illustration of a computational arrangement used to determine weight factors.
FIG. 19 is a table of data used in the conversion of RGB values.

FIG. 18 illustrates a computational arrangement 1800 used to determine the weight factors of a neural network 1802. A Munsell conversion table 1804 provides Vcd components and xyY components corresponding to HVC values. The xyY components are known color components that correspond to RGB values and from which RGB values can be determined. FIG. 19 illustrates a table of known data representing corresponding values of HVC and xyY values, available in Japanese Industrial Standard (JIS)Z8721.

In FIG. 18, an arithmetic comparison unit 1806 converts the xyY values obtained from table 1804 to RGB values according to the following equations (3) and (4)and provides the RGB values to neural network 1802.

$$X = xY/y \quad (3)$$

$$Z = (1 - x - y)Y/y$$

$$\begin{bmatrix} R \\ G \\ B \end{bmatrix} = \begin{bmatrix} 1.9106 & -0.5326 & -2.883 \\ -0.984 & 1.9984 & -0.0283 \\ 0.0584 & -0.1185 & -0.8985 \end{bmatrix} \begin{bmatrix} X \\ Y \\ Z \end{bmatrix}$$

Network 1802 computes vcd values corresponding to the RGB values, based on current values of the weight factors of network 1802. A comparison unit 1808 compares the vcd values computed by network 1802 with those from table 1804, and determines a conversion error of network 1802. This process is repeated so that network 1802 can learn the correct conversion by adjustment of weight factors. In practice, the learning process ended at approximately 10,000 cycles at which point the conversion error was 0.5 NBS, which is a unit of color difference. The NBS unit of color difference is more fully defined at pages 826–827 of "Color Science—Concepts and Methods, Quantitative Data and Formulae" by G. Wyszecki et al., second edition, John Wiley & Sons, which is incorporated herein by reference.

The determination of weight factors for a neural network used to convert color image data is disclosed in U.S. Pat. No. 5,162,899, which is incorporated herein by reference.

Value/hue/chrom converter 114 converts RGB color images of 7 horizontal pixels and 10 vertical pixels into Vcd images of 7 horizontal pixels and 10 vertical pixels and stores the results.

Figure 20:
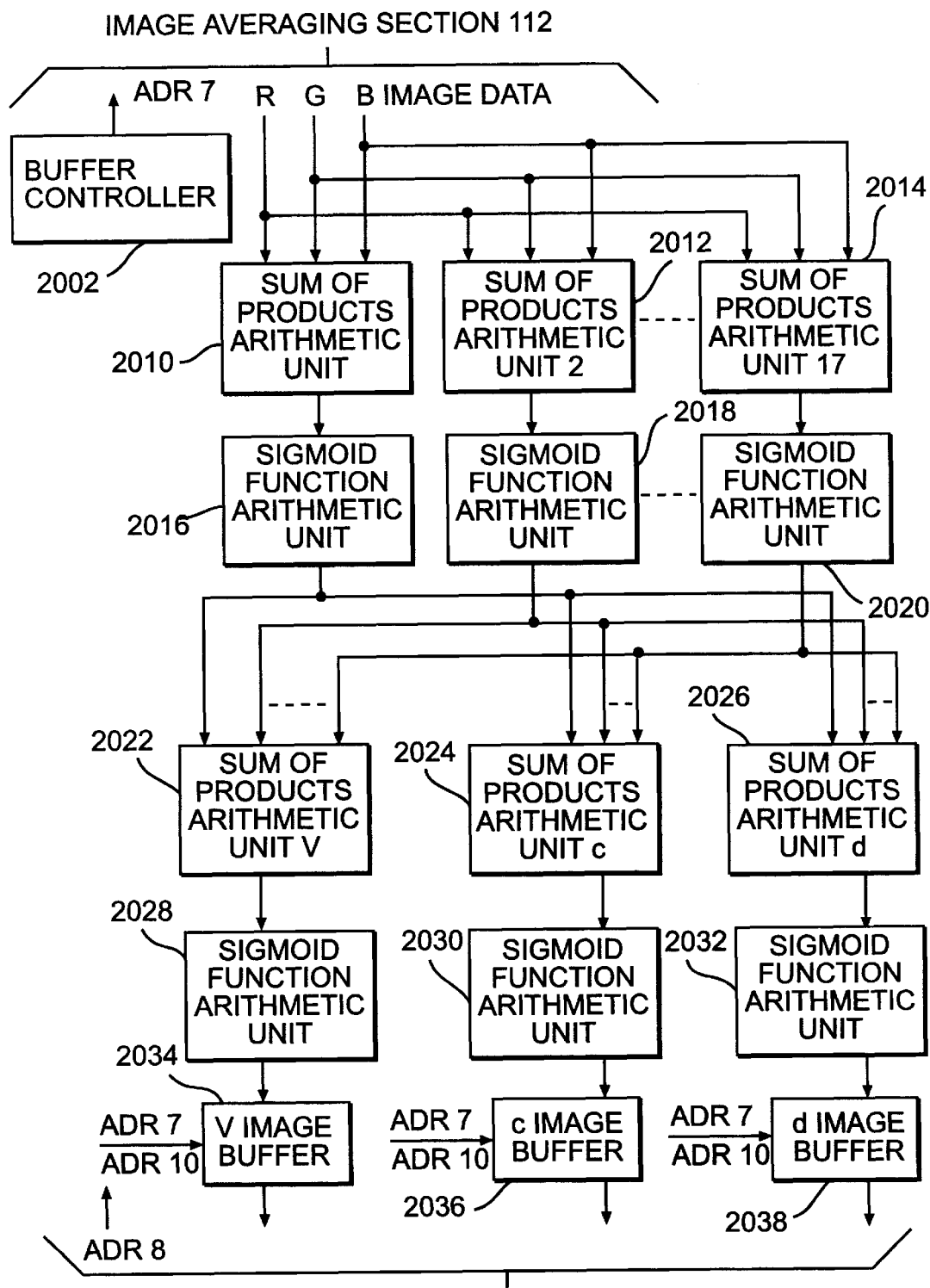
FIG. 20 is a block diagram of the value/hue/chroma converter.

FIG. 20 illustrates a block diagram of a construction of value/hue/chroma section 114. Section 114 includes a buffer controller 2002, which outputs an address signal ADR7. Based on this address signal, RGB image data are read out of the image buffers of image averaging section 112. Section 114 also includes seventeen sum-of-product arithmetic units 2010, 2012, and 2014, each connected to receive the RGB image data from section 112.

The three points of connection of each of the seventeen sum-of-products units to receive the R, C, and B image data represent the three units of the input layer of the neural network diagrammatically shown in FIG. 17. Each sum-of-products unit performs a computation having the form $X = W_1 I_R + W_2 I_G + W_3 I_B$, where $W_1$, $W_2$, and $W_3$ are weight factors and $I_R$, $I_C$, and $I_B$ are the R, G, and B image data, respectively.

The results computed by the seventeen units 2010–2014 are provided to seventeen sigmoid function arithmetic units 2016, 2018, . . . , and 2020. Each sigmoid function unit performs a computation having the form $\mathrm{Sig}(X) = 1/(1 + e^{-X})$, where X is the result computed by a corresponding sum-of-products unit. The seventeen sum-of-product units and seventeen sigmoid function units together form the intermediate layer of the neural network diagrammatically shown in FIG. 17.

Three sum-of-product arithmetic units 2022, 2024, and 2026 are each connected to receive the results computed by the seventeen units 2016–2020. Sigmoid function arithmetic units 2028, 2030, and 2032 are connected to receive the results computed by units 2022, 2024, and 2026, respectively. Units 2022–2026 and units 2028–2032 together form the output layer of the neural network and perform computations having the same form as described for those of the intermediate layer.

A V image buffer 2034, a c image buffer 2036, and a d image buffer 2038 are respectively connected to receive the results computed by units 2028, 2030, and 2032, such results being written into these buffers in accordance with address signal ADR7.

Here, the sum of products arithmetic units of the intermediate layers and the output layers have been provided in advance with weighted values of the neural network that were studied as illustrated in FIG. 18.

Figure 21:
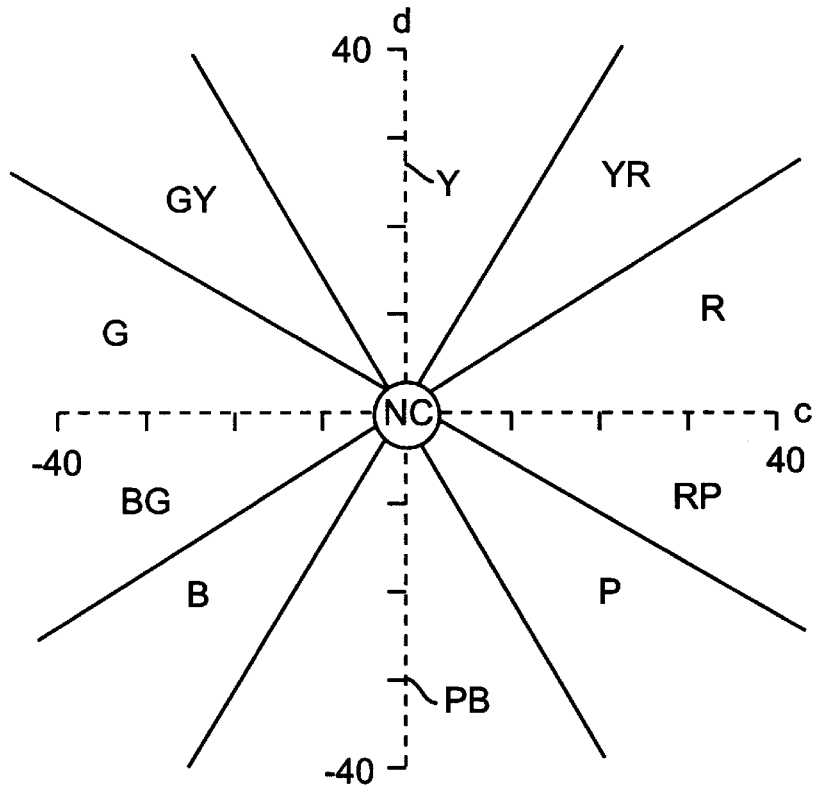
FIG. 21 is a diagram of color data.

From buffers 2034, 2036, and 2038 color feature extractor 116 reads color data representing image data computed by the value/hue/chroma converter 114. For example, in order to determine color features to be extracted, extractor 116 computes mean values of c and d values of image data that are computed by the value/hue/chroma converter 114. FIG. 21 illustrates a plot of color data corresponding to R, YR, Y, GY, C, BG, B, PB, P, RP, and NC as a function of c and d. This breakdown of color data corresponds to the Munsell system and is disclosed in JJS Z8721, although the inventors herein are arbitrarily using components c and d. Depending on the computed mean values, the position where the image is located in the color data ranges illustrated in FIG. 21 is output as color feature data, such as one of R, YR, Y, etc.

Figure 22:
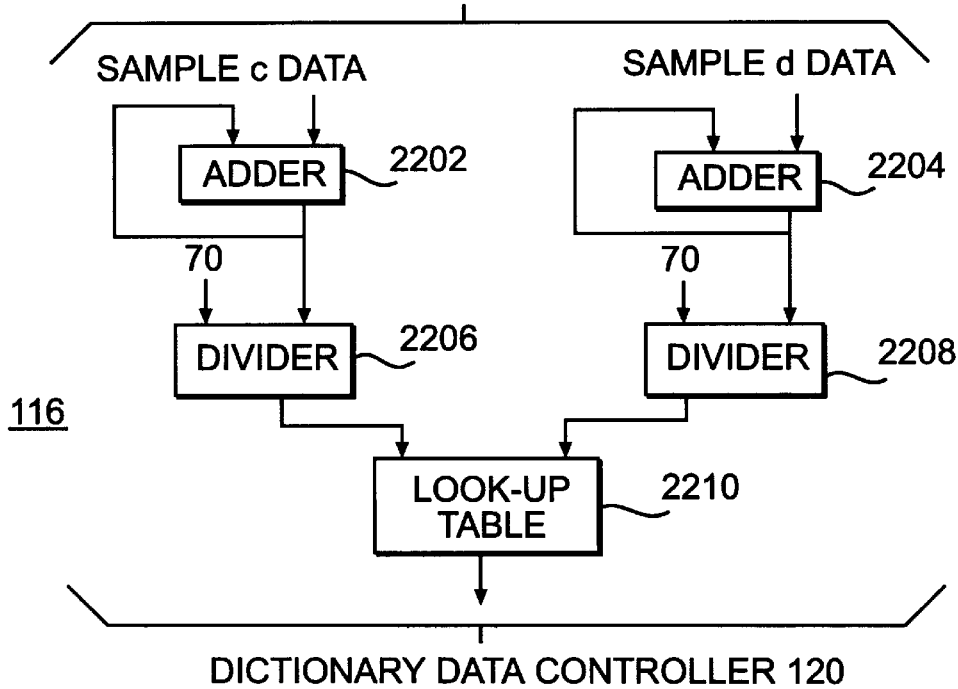
FIG. 22 is a block diagram of a color feature extractor.

FIG. 22 illustrates a block diagram of a construction of color feature extractor 116. Extractor 116 includes adders 2202 and 2204 connected to receive the c and d pixel image data, respectively, which data is stored in converter 114. This data is read from image buffers 2034, 2036, and 2038 of converter 114 for each of the 70 sample pixels in response to an address signal ADR8 generated by pattern matching section 122, as discussed below. Each of adders 2202 and 2204 is configured to compute a sum for the pixel image data for the 70 sample pixels. The sums computed by adders 2202 and 2204 are applied to dividers 2206 and 2208, each of which divides the sum applied to it by the total number of sample pixels, i.e., 70. As a result, dividers 2206 and 2208 compute mean values of c and d, respectively, for the image to be identified. A look-up table 2210 stores information corresponding to the color data illustrated in FIG. 21.

The computed mean values of c and d are input as address signals and the look-up table 2210 outputs codes or numerical values corresponding to the inputted mean values, for example, 1 (R), 2 (YR), 3 (Y), 4 (C), 5 (G), 6 (BG), 7 (B), 8 (PB), 9 (P), 10 (PR) and 11 (NC).

Further, for features of colors extracted by the color feature extractor 116, data other than average hue and chroma data of the entire image may be used. For example, distributed values/central values of 70 pixel values f(x,y) of an averaged image, a pixel value of highest value, or a pixel value of lowest value can be used and are within the intent of the present invention.

Dictionary data controller 120 causes only a portion of the image data stored in dictionary data storage section 118 to be transmitted to the pattern matching section 122 and bases a selection of the transmitted portion on the color feature data output from color feature extractor 116. In dictionary data storage section 118, data corresponding to target or reference images have been stored at different storage locations according to color feature data codes computed by color feature extractor 116 when collecting dictionary data. The initial storage of this dictionary data is achieved in the same manner as described above concerning processing the image to be identified using apparatus 100. Thus, each target reference image is imaged and processed so that Vcd image data output from the value/hue/chroma converter 114 for the target image are stored in the dictionary data storage section 118, which is controlled by the dictionary data controller 120, according to color feature data output from color feature extractor 116 for that target image. FIG. 23A illustrates an example of the data format of storage section 118 in which the target image data is grouped by categories R, YR, Y, etc, corresponding to the color feature data that can be extracted by extractor section 116 as illustrated in FIG. 22.

FIG. 23B illustrates a construction of dictionary data controller 120 and dictionary data storage section 118. Storage section 118 includes a memory 2302 in which respective target images are stored in categories according to the color feature code outputs of extractor 116. In dictionary data controller 120, a decoder 2304 converts the color feature code output from color feature extractor 116 for an image to be identified into, for example, the more significant address bits of memory 2302 in storage section 118. In response, Vcd image data of a target image of the category is output according to the color feature code specified by controlling the more significant address bits of the memory 2302. An address controller 2306 of controller 120 is responsive to an address signal ADR9 from pattern matching section 122 to generate less significant address bits of memory 2302 to enable reading of successive target images within the category specified by the more significant address bits from decoder 2304. Controller 120 also includes an image data buffer 2308 that receives image data retrieved from storage section 118 for provision to pattern matching section 122.

Pattern matching section 122 compares Vcd image data of an image to be identified as outputted by value/hue/chroma converter 114 with Vcd image data of one or more target images retrieved by dictionary data controller 120 from the dictionary data stored in dictionary data storage section 118, and selects the most similar target image. In comparing image data, a similarity of a 7×10 sample pixel pattern of the image to be identified with a 7×10 sample pixel pattern of a target image of the dictionary data is sought. In seeking the similarity, the following equations (5) are executed for sample vcd images to be identified Vs(i), cs(i), ds(i) [i=0,1, . . . 69] and dictionary target Vcd images Vd(i), cd(i), dd(i) [i=0,1, . . . 69], $$SimV = \sum (Vs(i) \times Vd(i)) / \sqrt{\sum (Vs(i)^2) \times \sum (Vd(i)^2)} \quad (5)$$

$$Simc = \sum (cs(i) \times cd(i)) / \sqrt{\sum (cs(i)^2) \times \sum (cd(i)^2)}$$

$$Simd = \sum (ds(i) \times dd(i)) / \sqrt{\sum (ds(i)^2) \times \sum (dd(i)^2)}$$

Then the following equation (6) is executed to determine similarity:

$$Sim = \sqrt{SimV^2 + Simc^2 + Simd^2} \quad (6)$$

For example, the similarity of the V image data of an image to be identified as illustrated in FIG. 24 with dictionary V data of a target image as illustrated in FIG. 25 is computed as follows:

$$SimV =$$

$$(6 \times 7 + 13 \times 15 + 13 \times 15 + 13 \times 15 + 13 \times 17 + 6 \times 7 + 9 \times 10 +$$

$$17 \times 18 + 21 \times 23 + 26 \times 27 + 31 \times 33 + 30 \times 32 + 17 \times 18 +$$

-continued $$9\times10+17\times18+32\times35+45\times47+52\times53+57\times59+$$
$$28\times20+10\times11+24\times26+35\times38+42\times45+66\times70+$$
$$81\times83+28\times29+12\times13+30\times31+41\times43+52\times55+$$
$$88\times91+119\times121+35\times36+14\times15+32\times33+$$
$$45\times48+55\times57+91\times96+125\times127+30\times37+$$
$$11\times12+25\times28+51\times53+55\times57+118\times121+$$
$$121\times124+31\times32+11\times12+27\times29+44\times46+$$
$$45\times48+59\times61+63\times65+23\times32+9\times10+15\times17+$$
$$15\times17+15\times17+15\times17+17\times19+12\times24+6\times7+$$
$$13\times15+13\times15+13\times15+13\times15+13\times15+6\times7)/$$
$$((6\times6+13\times13+13\times13+13\times13+13\times13+13\times13+6\times6+$$
$$9\times9+17\times17+21\times21+26\times26+31\times31+30\times30+$$
$$17\times17+9\times9+17\times17+32\times32+45\times45+52\times52+$$
$$57\times57+28\times28+10\times10+24\times24+35\times35+42\times42+$$
$$66\times66+81\times81+28\times28+12\times12+30\times30+41\times41+$$
$$52\times52+88\times88+119\times119+35\times35+14\times14+32\times32+$$
$$45\times45+55\times55+91\times91+125\times125+30\times30+$$
$$11\times11+25\times25+51\times51+55\times55+118\times118+$$
$$121\times121+31\times31+11\times27+27\times27+44\times44+$$
$$45\times45+59\times59+63\times63+23\times23+9\times9+15\times15+$$
$$15\times15+15\times15+15\times15+17\times17+12\times12+6\times6+$$
$$13\times13+13\times13+13\times13+13\times13+13\times13+6\times6)^{1/2}\times$$
$$(7\times7+13\times15+15\times15+15\times15+15\times15+15\times15+$$
$$7\times7+10\times10+18\times18+23\times23+27\times27+33\times33+$$
$$32\times32+18\times18+10\times10+18\times18+35\times35+47\times47+$$
$$53\times53+59\times59+29\times29+11\times11+26\times26+38\times38+$$
$$45\times45+70\times70+83\times83+29\times29+13\times13+31\times31+$$
$$43\times43+55\times55+91\times91+121\times121+36\times36+15\times15+$$
$$33\times33+48\times48+57\times57+96\times96+127\times127+33\times37+$$
$$12\times12+28\times28+53\times53+57\times57+121\times121+$$
$$124\times124+32\times32+12\times12+29\times29+46\times46+$$
$$48\times48+61\times61+65\times65+32\times32+10\times10+17\times17+$$
$$17\times17+17\times17+17\times17+19\times19+24\times24+7\times7+$$
$$15\times15+15\times15+15\times15+15\times15+15\times15+7\times7))^{1/2}$$

In this case, a target image with the greatest similarity is output as a result of identification.

Figure 26:
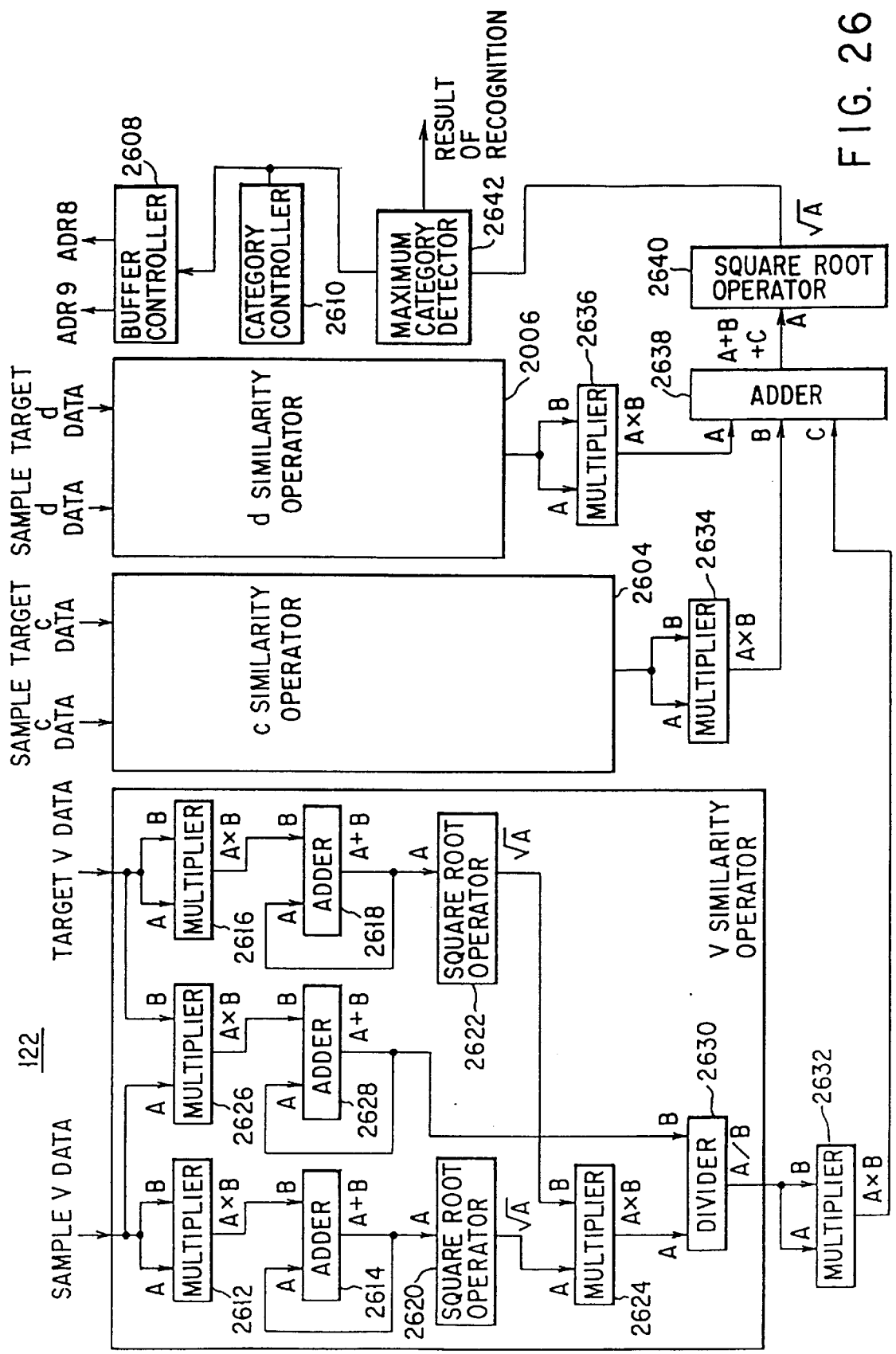
FIG. 26 is a block diagram of the pattern matching section.

FIG. 26 illustrates a block diagram of a construction of pattern matching section 122. A V similarity operator 2602, a c similarity operator 2604, and a d similarity operator 2606 all have substantially the same construction so that only the V similarity operator 2602 is described in detail with respect to the operation of determining similarity. A buffer controller 2608 outputs address signal ADR9 corresponding to less significant bits of an address for reading dictionary data in accordance with a signal from a category controller 2610 and an address signal ADR8 for reading image data of an image to be identified from the value/hue/chroma converter 114 at the same time. As a result, section 122 reads the sample image data of the image to be identified and the target image data at the same time.

In V similarity operator 2602, a multiplier 2612 is connected to receive the image data for every pixel of the V image of the sample image data and computes a squared value. An adder 2614, configured with its own output as one of its inputs, accumulates the squared values computed by multiplier 2612. In a similar manner, a multiplier 2616 is connected to receive the target image data for every pixel of the target image and computes a squared value for every such pixel. An adder 2618, configured like adder 2614, computes a cumulative value of the squared values computed by multiplier 2616.

Square root operators 2626 and 2622 are respectively connected to receive the sums computed by adders 2614 and 2618. When buffer controller 2608 ends the reading of sample data for one image, square root operators 2620 and 2622 compute square roots of the outputs from adders 2614 and 2618, respectively. A multiplier 2624 computes a product of the square roots computed by operators 2620 and 2622. This is equivalent to the denominator terms of equation (5) described above. At substantially the same time, a multiplier 2626 obtains a product of every pixel of a V image of sample image data and that of target image data. An adder 2628, configured like adder 2614, accumulates the products from multiplier 2626 to provide values of the numerator terms of equation (5). A divider 2630 computes a quotient of an output value of the adder 2628 divided by an output value of the adder 2624 to provide a similarity factor.

Similarly, c similarity operator 2604 and d similarity operator 2606 obtain similarity factors of the c image data and that of d image data, respectively. Then, multipliers 2632, 2634, and 2636 compute a squared value of the similarity factors for the V, c, and d image data, respectively. An adder 2638 connected to multipliers 2632, 2634, and 2638 computes the sum of the three squared values. A square root operator 2640 connected to adder 2638 computes the square root of the sum from adder 2638. These operations constitute the calculation of equation (6). This determination of similarity is repeatedly performed by accessing in dictionary section 118 the next target image within the category specified by extractor 116 via decoder 2304 of controller 120. A category having the highest similarity is output by a maximum category detector 2642 as the result of identification.

As an alternate embodiment of pattern matching section 122, a cumulative figure of color difference between the sample image data and target image data can be computed and a pattern which is closest among dictionary data selected. First, values of sample and dictionary target image data values Vs(i) and Vd(i), respectively, are normalized using values Vsmax and Vsmin, which are the maximum and minimum values of the sample data values Vs(i), and Vdmax and Vdmin, which are the maximum and minimum values of the dictionary target data values Vd(i). For example, Vdmax and Vdmin are the single largest and smallest pixel values in the category of target image data values being considered.

After executing a conversion effected by equations (7), below, for respective images, $$Vs'(i)=255\times(Vs(i)-Vsmin)/(Vsmax-Vsmin)$$

$$Vd'(i)=255\times(Vd(i)-Vdmin)/(Vdmax-Vdmin) \qquad (7)$$

a cumulative color difference value dc is obtained according to equation (8) below. Then, a cumulative color difference for each category is computed, and the smallest category is output as the result of identification. In the following expression, k is a weight constant determined for calculating color differences.

$$dc = \sum_{0}^{64} ((Vs'(i) - Vd'(i))^2 + k \times (cs(i) - cd(i))^2 + k \times (ds(i) - dd(i))^2)^{1/2} \quad (8)$$

FIG. 27 illustrates a block diagram of a construction of the alternate embodiment matching section 122'. A buffer controller 2702 outputs the address signal ADR9 corresponding to less significant address bits for identifying dictionary data in accordance with a signal from a category controller 2704 and the address signal ADR8 for reading sample image data of the image to be identified from value/hue/chroma converter 114. As a result, section 122' reads the sample image data of the image to be identified and the target image data at the same time.

In order to normalize depth of color, V image data of sample image data and target image data are respectively written into a sample image V image buffer 2706 and a target image V image buffer 2708. Maximum image data value detectors 2710 and 2712 and minimum image data value detectors 2714 and 2716 are connected to monitor the data as written into buffers 2706 and 2708 and determine the maximum and minimum values of the sample and target image data. After determining the maximum and minimum values of the sample and target image data, buffer controller 2702 generates address signal ADR10 to control reading of image data from each of buffers 2706 and 2708 for each of the 70 sample pixels. Subtracters 2718 and 2720 are connected to compute the difference between the maximum and minimum values of the sample V image data and target V image data, respectively, for each sample pixel. These results are required for the denominators of equations (7). Subtracters 2722 and 2724 are connected to compute the difference between V image data and the minimum detected data value for the sample data and target data, respectively, for each sample pixel. These results are required for the numerators of equations (7).

Multipliers 2726 and 2728 are connected to multiply the numerators of equations (7) by 255. Dividers 2730 and 2732 perform the divisions in equations (7) for the sample data and the target data, respectively, for each sample pixel. Subtracter 2734 performs the subtraction of the first term of equation (8).

Buffer controller 2702 generates address signals ADR8 and ADR9 to read c and d sample and target image data from the image buffers of section 114 and storage section 118, respectively. Subtracters 2736 and 2738 are connected to receive this data to compute the differences in the second and third terms of equation (8), respectively, for each sample pixel. Multipliers 2740, 2742, and 2744 are connected to compute the square of the difference in the first, second. and third terms of equation (8), respectively. Multipliers 2746 and 2748 are connected to perform the multiplication by the weight constant k in each of the second and third terms of equation (8), respectively.

Adder 2750 is connected to multipliers 2740, 2746, and 2748 to compute the sum of the three terms of equation (8) for each sample pixel. Square root operator 2752 is connected to compute the square root of the sum provided by adder 2750. Adder 2754 receives the square root computed by operator 2752 for each sample pixel and performs the summation of the square roots for the 70 sample pixels, as required by equation (8), to provide the cumulative color difference value dc.

This cumulative color difference cumulative value dc is calculated for each target image in the category designated by extractor 116. A target image with the smallest value of dc is selected and output as the result of identified by a minimum category detector 2756.

The result of identification that is output from the pattern matching sections 122 and 122' is output to external equipment by the identification result output section 124.

As described above, according to the first embodiment, when color image data including an object to be identified are input, the object to be identified is extracted from the input color image data and the input color image data thereof are normalized to a uniform size. Then, the normalized image data are converted into averaged image data which are further converted into Vcd image values that represent a quantity of human perception. The whole color feature quantity is extracted, and it becomes possible to identify a color image very precisely at a high speed by comparing a part of predetermined dictionary data, which is selected by the color feature quantity, with Vcd data values of the object to be identified used to enable identification.

Next, a second embodiment of the invention is described.

FIG. 28 is a block diagram showing a construction of an image identifying apparatus 2800 of the second embodiment of this invention. Elements in FIG. 28 that are the same as those in FIG. 1 are designated by the same reference numerals, and a detailed explanation of those elements is omitted. The apparatus of the second embodiment is substantially the same as that illustrated in FIG. 1 except that value/hue/chroma converter 114 is omitted. However, apparatus 2800 can also effectively enable identification of an object.

An object P to be identified is imaged by TV camera 102 as an RGB image, converted into a digital RGB image in color image input section 104, and stored in image data storage section 106. Object detection/cut-off section 108 determines the position data of the object to be identified in the image data stored in section 106 and extracts its RGB image data. Thereafter, the RGB image data of the object to be identified are converted to a fixed size in normalizing converter 110 and are converted into an averaged image in image averaging section 112.

Figure 29:
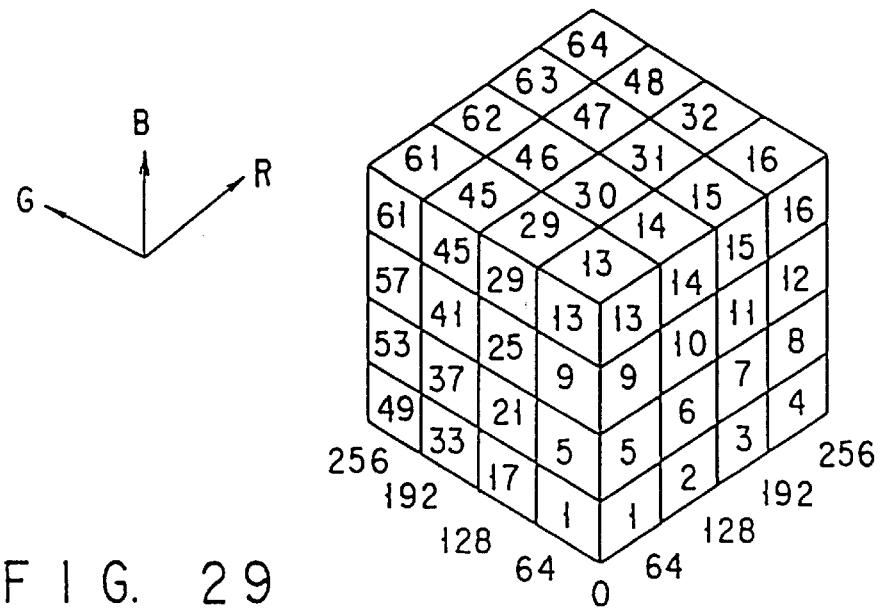
FIG. 29 is a conceptional drawing showing the range of data classified by the color feature extractor in the second embodiment.

Color feature extractor 116' extracts features from the averaged color image. In color feature extractor 116', for example, mean R, G, and B values of the 70 sample pixels are computed, respectively. These three mean values are then evaluated as to their locations within 64 different color ranges. As illustrated in FIG. 29, the 64 different ranges represent a simplification of a more finely graded scale of 256 color values for each or the R, C, and B components.

Figure 30:
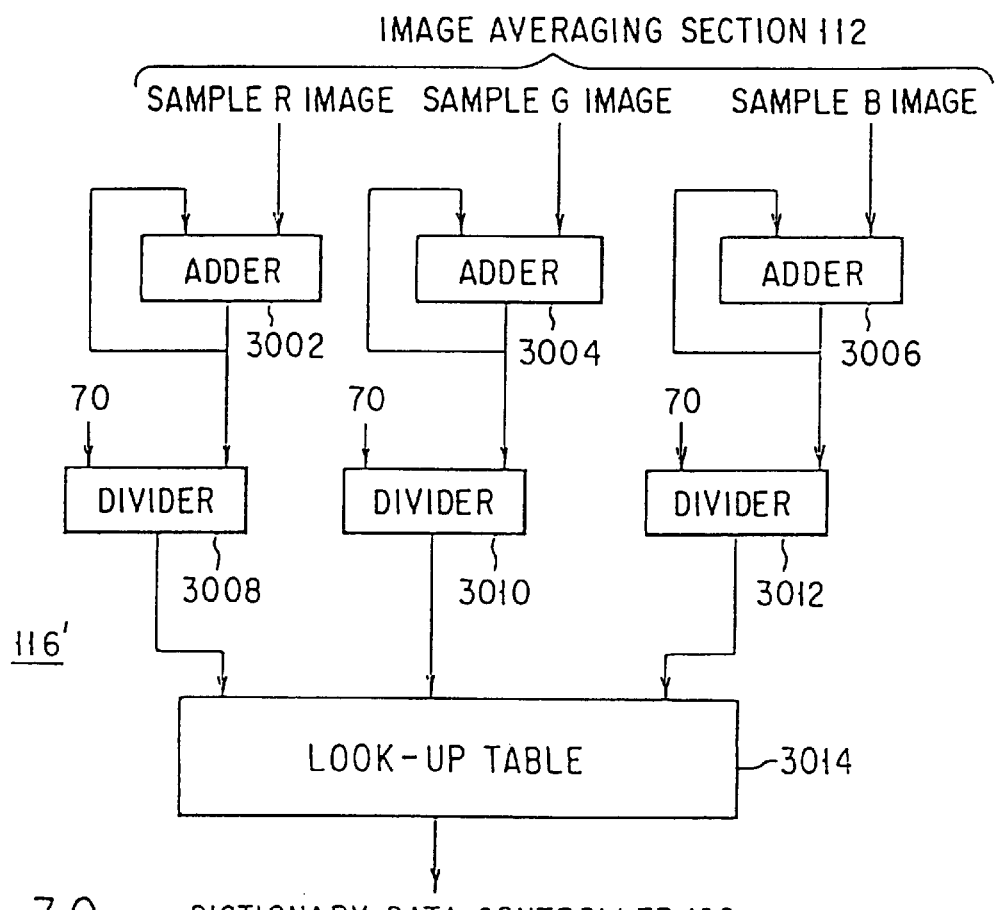
FIG. 30 is a block diagram of the color feature extractor in the second embodiment.

The color feature extractor can be provided as a color feature extractor 116' which can be constructed, for example, as illustrated in FIG. 30. RGB image data read from the R, G, and B buffers of image averaging section 112 are received by adders 3002, 3004 and 3006, which sum the image data for the 70 sample pixels. Dividers 3008, 3010, and 3012 divide the sums computed by adders 3002, 3004, and 3006, respectively, by the number of sample pixels, i.e., 70, and provide mean R, G, and B values, respectively.

The data represented by the mean R, G, and B values in FIG. 29 are previously written into a look-up table 3014 so that look-up table 3014 outputs numerical values, for example corresponding to the 64 color ranges, as address signals corresponding to more significant address bits for RGB target image data stored in the storage section, provided as a dictionary data storage section 118'.

Dictionary data storage section 118', is divided in advance according to data that are output from the color feature extractor 116' when dictionary data are initially generated. FIG. 31 illustrates an example of the organization of the RGB data in section 118' arranged into 64 categories corresponding to the 64 different ranges that can be identified by extractor 116'.

Referring again to FIG. 28, a part of the RGB image data stored in dictionary data storage section 118' is transmitted to the pattern matching section 122 according to data received by dictionary data controller 120 from color feature extractor 116.

Pattern matching section 122 compares the dictionary data output from dictionary data controller 120 with the image data of the object to be identified and an identity of the target image data in the category corresponding to the data from extractor 116' is output from identification result output section 124.

In the second embodiment, value/hue/chroma converter 114 is omitted for the image identifying apparatus illustrated in FIG. 1, and although accuracy of identification may drop slightly, the construction of the apparatus becomes simpler.

Next, a third embodiment of the invention is described.

FIG. 32 is a block diagram showing the construction of an image identifying apparatus 3200 of the third embodiment of the present invention. Elements in FIG. 32 that are the same as those in FIG. 1 are designated by the same reference numerals and explanations of those elements are omitted. In the third embodiment, a data base controller 3202, a keyboard 3204, a data base storage section 3206, and a display 3208 have been added to the apparatus shown in the first embodiment illustrated in FIG. 1. This arrangement facilitates the efforts of an operator performing image retrieval by using the image identification results.

In accordance with the third embodiment, data base controller 3202 is connected to receive the result of identification output by section 124. Controller 3202 is connected to control access to data stored in data base 3206. Keyboard 3204 is connected to enable a user to access data stored in data base 3206 for display on display 3208.

Figure 33:
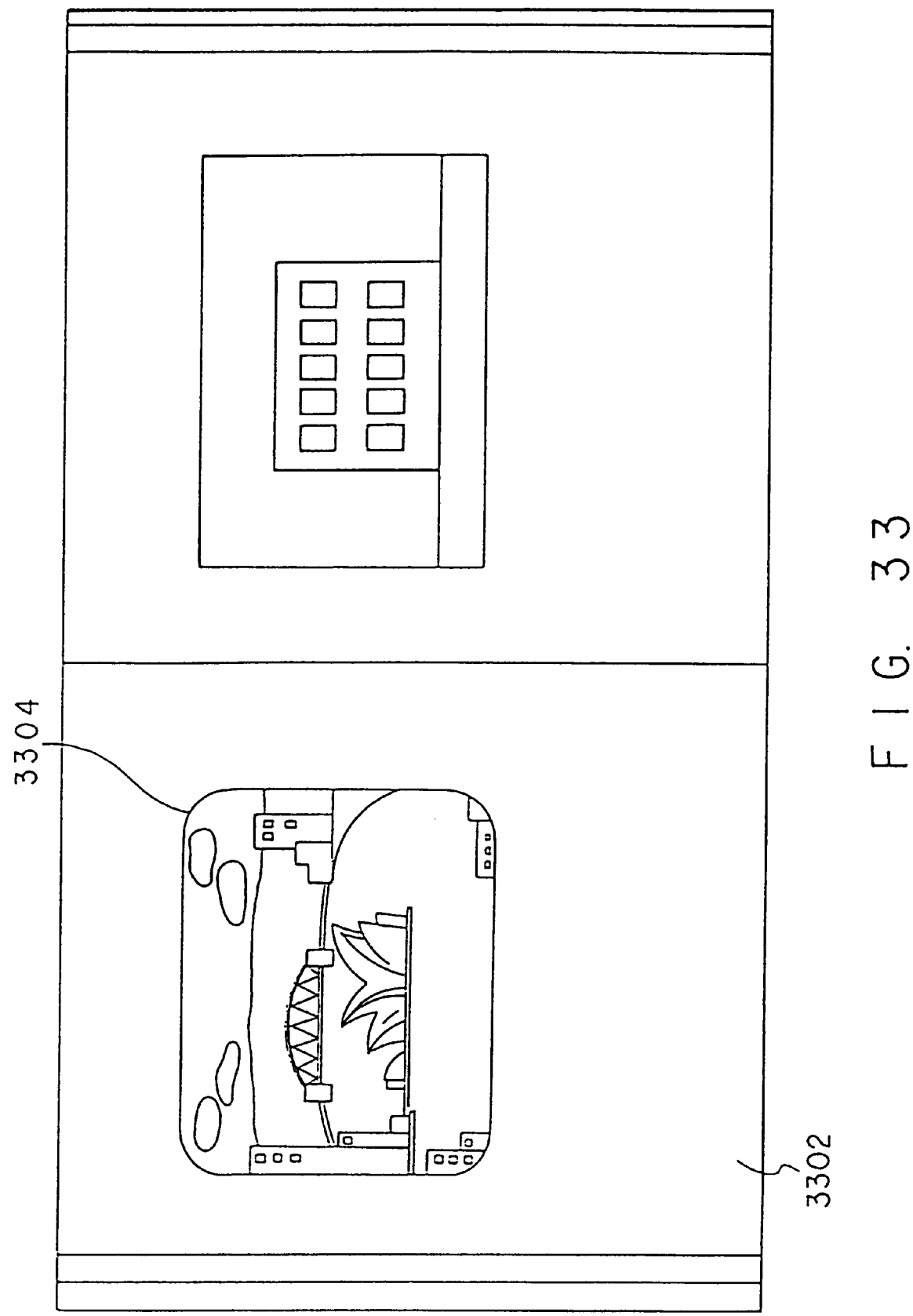
FIG. 33 is a diagram of an example of a catalog containing an object to be recognized.

FIG. 33 illustrates one page 3302 of a catalog on which an image of a photograph 3304 that it is desired to identify has been printed. Page 3302 is imaged by TV camera 102 as an RGB image, converted into a digital RGB image data in color image input section 104, and stored in image data storage section 106. Object detection/cut-off section 108 determines the position data of photograph 3304 and extracts its RGB image data. This RGB image data is converted to a fixed size in normalizing converter 110 and converted into an averaged image in image averaging section 112. The averaged image is converted into a Vcd image in value/hue/chroma converter 114. Then, color feature extractor 116 determines color features of the entire cut-off image, and dictionary data controller 120 reads out data in the range specified by color feature extractor 116 from the target image data stored in dictionary data storage section 118. In succession, pattern matching section 122 compares the input Vcd image with a plurality of target image data, and category data of the closest pattern is output from identification result output section 124. Based on this identification result, data base controller 3202 outputs to display 3208 data stored in the data base 3206 which is related to the object or image to be identified.

Figure 35A:
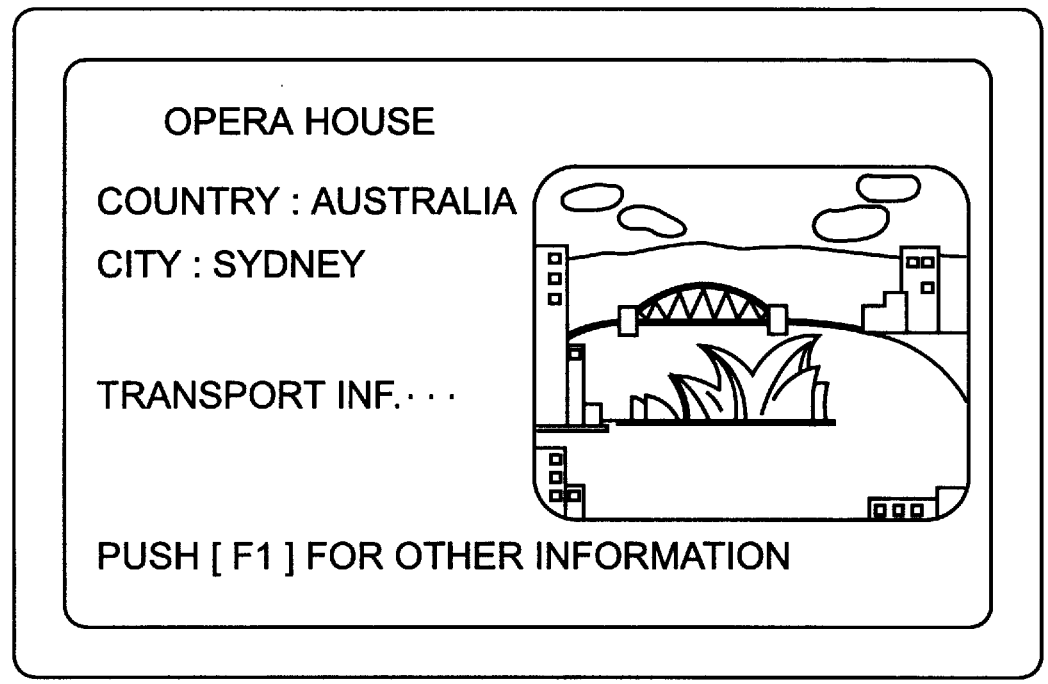
FIG. 35A is an illustration of an example of the screen displayed on a display unit of the third embodiment.
Figure 35B:
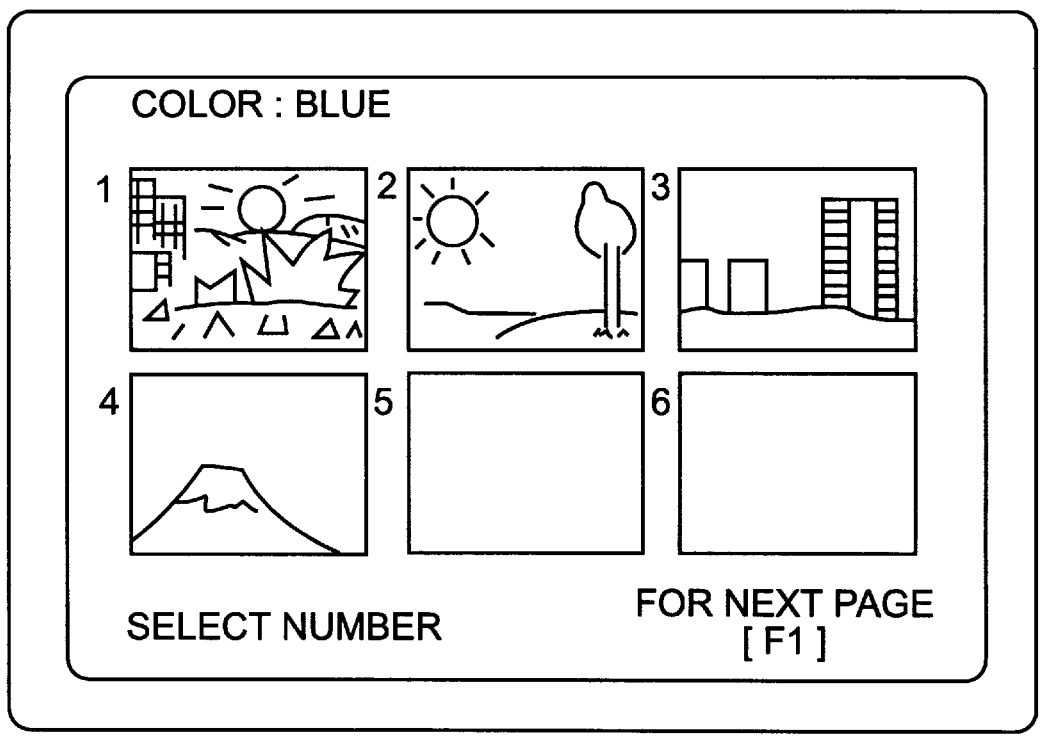
FIG. 35B is an illustration of another example of the screen displayed on the display unit of the third embodiment.

Data base 3206 stores images and data such as characters, patterns, images, voice, etc., arranged in memory according to the respective categories used to make an identification. For example, FIG. 34 illustrates a possible arrangement of the data in data base 3206. The data base controller 3202 extracts related data from this data base according to the category data output from identification result output section 124 and displays data, for example, as illustrated in FIG. 35A, together with the result of identification. The keyboard 3204 enables the operator to provide input category data of a kind classified by color feature extractor 116. Data base controller 3202 can display image choices of a particular category inputted by the operator and stored in data base 3206, as illustrated in FIG. 35B. This enables the operator to retrieve image and related data different from the image identified by output section 124.

While practice of the third embodiment is illustrated as including value/hue/chroma converter 114, the invention is not so limited. The utility and advantages realized by provision of data base 3206 and user access via keyboard 3204 are also obtained by provision of elements 3202–3208 in apparatus which does not include converter 114, such as in apparatus 2800 illustrated in FIG. 28.

Next, a fourth embodiment of the invention will be described.

Figure 36:
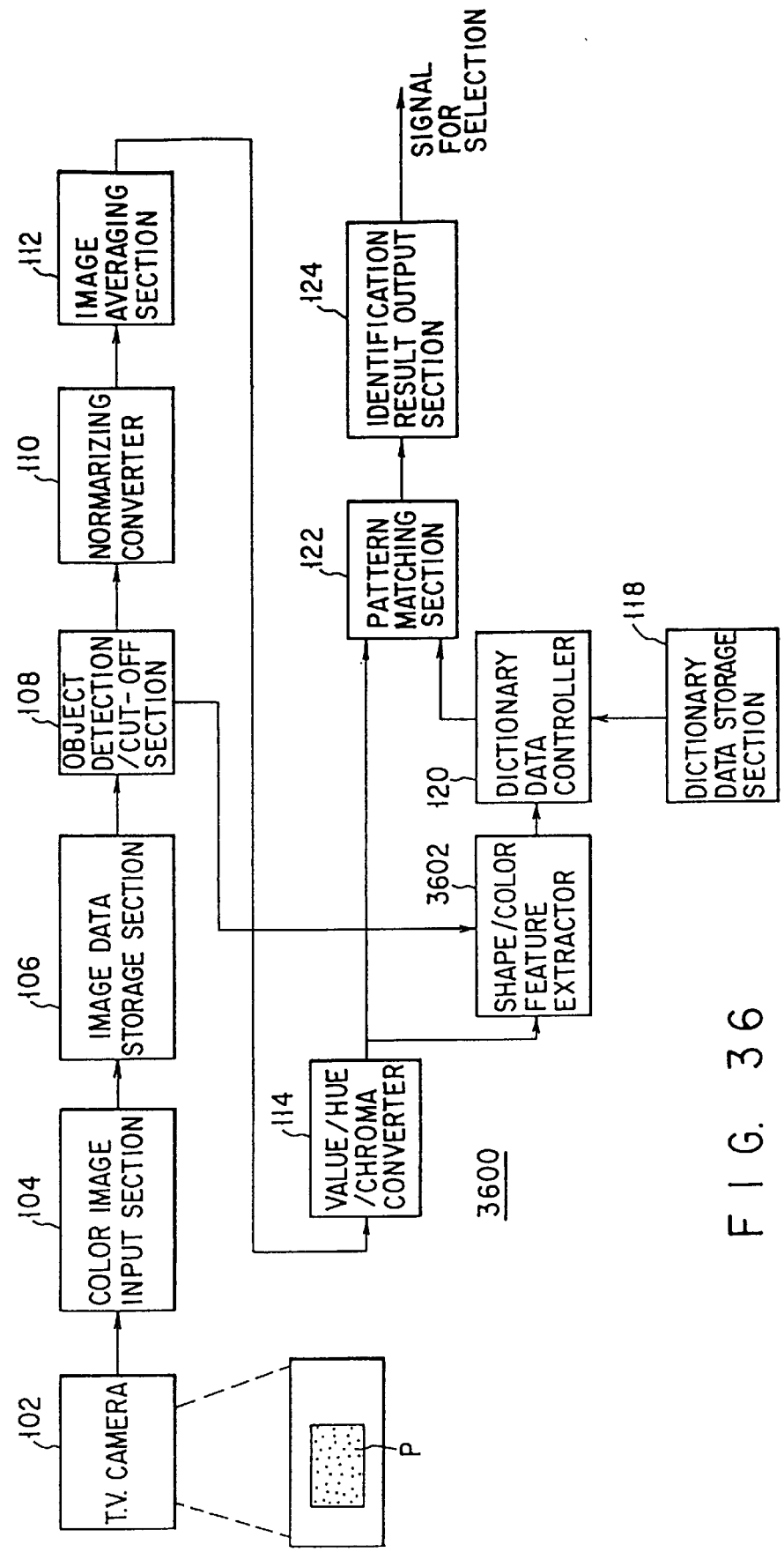
FIG. 36 is a block diagram of an image identifying apparatus of a fourth embodiment of the invention.

FIG. 36 is a block diagram showing the construction of an image identifying apparatus 3600 of the fourth embodiment of the invention. Elements in FIG. 36 that are the same as those in FIG. 1 are designated by the same reference numerals and explanations of those elements are omitted. The apparatus in this embodiment is a system to identify kinds of postage stamps on postal matters. Color feature extractor 116 is omitted from the apparatus and a shape/color feature extractor 3602 is inserted in place of extractor 116.

With reference to FIG. 37, a piece of mail 3700 containing a stamp 3702 is picked up as an RGB image by the TV camera 102. This color image is converted into a digital RGB image in color image input section 104 and stored in image data storage section 106. For the RGB image data in image data storage section 106, object detection/cut-off section 108 detects the position data of stamp 3702 on mail 3700 and extracts the RGB image data. The extracted RGB image data is then converted to a fixed size in normalizing converter 110 and further converted into an averaged image in image averaging section 112. The averaged image is converted into a Vcd image in value/hue/chroma converter 114.

Figure 38:
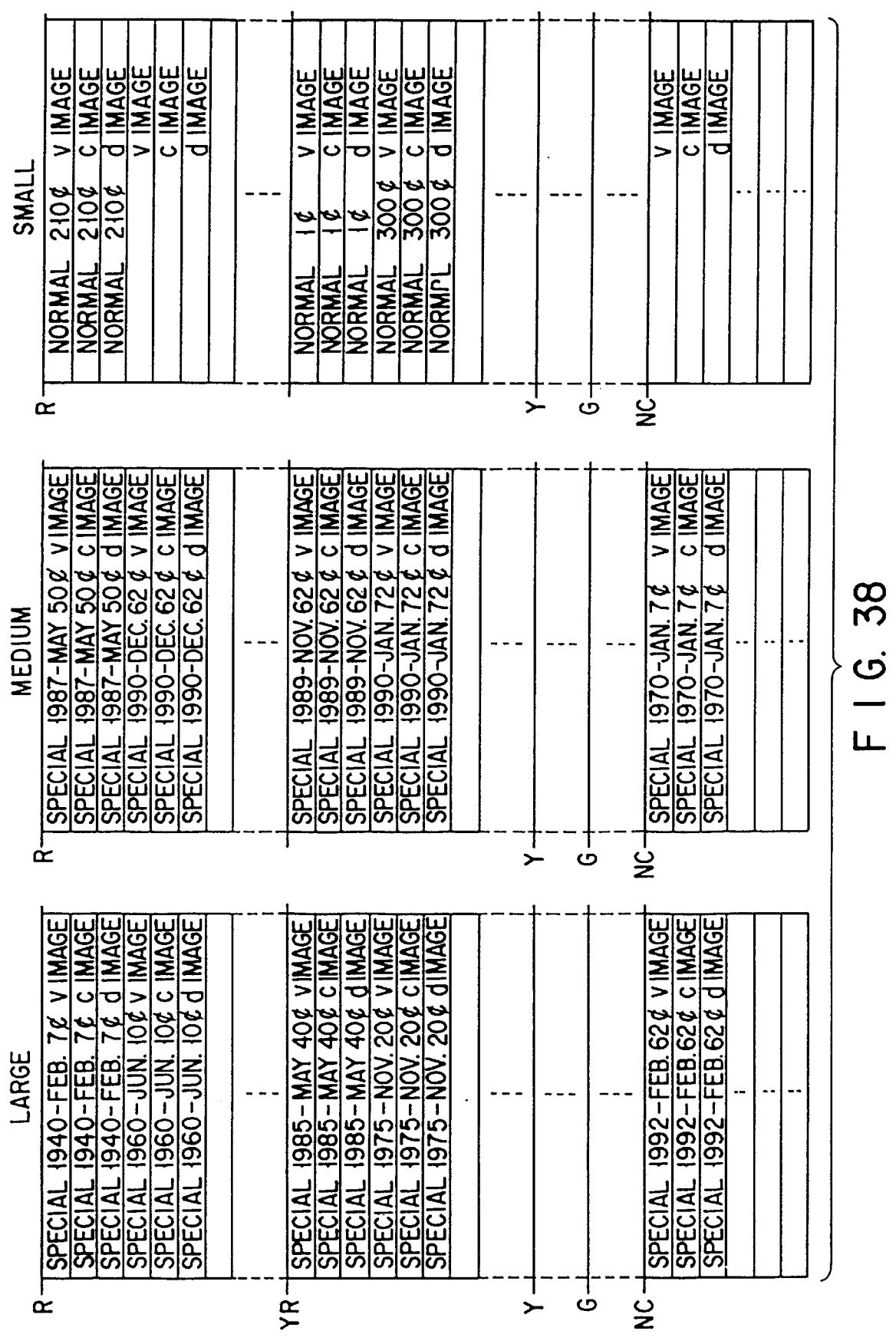

Next, shape/color feature extractor 3602 obtains the area or size of the cut-off image, as well as an extracted color feature. Dictionary data controller 120 reads data in the range specified by shape/color feature extractor 3602 out of dictionary data stored in the storage section provided as a dictionary data storage section 118". In dictionary data storage section 118", data are separately stored by size and color features as illustrated in FIG. 38. In succession, the pattern matching section 122 compares input Vcd images with a plurality of dictionary data target images and a closest pattern category is output from the identification result output section 124 as a signal indicating, for example, insufficient postage.

While practice of the fourth embodiment of the invention is illustrated in FIG. 36 as including value/hue/chroma converter 114, the invention is not so limited. The utility and advantages realized by use of the area or size of the object to be identified to categorize data stored in dictionary section 118" are also obtained in color feature extraction performed without conversion to Vcd data and instead performed using RGB data, such as in system 2800 in FIG. 28.

While embodiments of color feature extractor 116 have been illustrated and described, the invention is not so limited. Image data can be categorized according to values of one or more of the smallest, largest, and central pixel magnitude values for each of the V, c, and d image data. A correlation between such smallest, largest, and central pixel values and image color codes, such as those illustrated in FIG. 21 can be stored in a look-up table that provides the corresponding color code as the outout of extractor 116 for input to dictionary controller 120.

Figure 39:
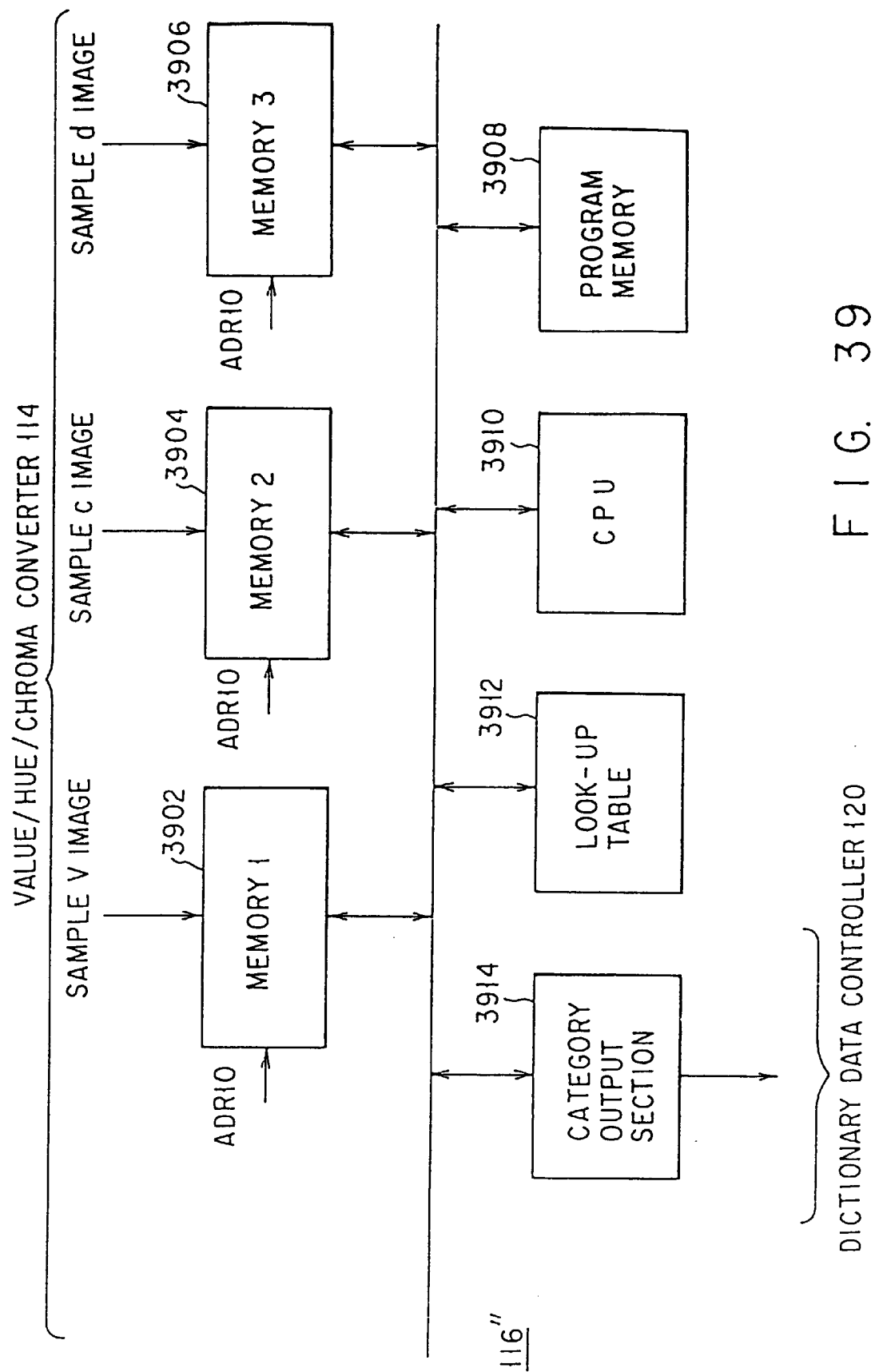
FIG. 39 is a block diagram of another construction of a color feature extractor.

FIG. 39 illustrates an embodiment of the color feature extractor provided as a color feature extractor 116" which extracts color features based on one or more of the smallest, largest, and central pixel values. With reference to FIG. 39, Vcd image data are read from value/hue/chroma converter 114 in accordance with address signal ADR10 generated by section 122 and are stored in a memory 3902, a memory 3904 and a memory 3906. According to program instructions stored in a program memory 3908, a CPU 3910 then determines pixel values of one or more of the central, largest, and smallest values for one or more of the V, c, and d image data. For example, according to the program instructions, the 70 sample pixel values are arranged in the order of size of the respective V values, and pixel V values ranking 34th or 35th, 69th, and 0th in the order are identified as pixel V values of the central, largest, and smallest values, respectively. One of these features is used, e.g., the smallest pixel V value. Next, the c and d values of the pixel having the smallest V value are determined. A look-up table 3912 stores color codes and their correspondence to one or more of the central, largest, and smallest pixel values. In this example, the set of Vcd values for the smallest pixel V value are applied to look-up table 3912 which, in response, provides a corresponding color code data. A category output section 3914 is responsive to the output color code to provide a category of image data to dictionary controller 120.

With reference to FIG. 21, if the c and d values computed by extractor 116 are below 2, the image is regarded to be a noncolor image and an NC code is assigned. However, it may be necessary to discriminate between a first case in which all pixels are colored and only mean values are noncolored and a second case in which all pixels are noncolored. Thus, in accordance with a further embodiment, the color feature extractor is constructed to discriminate between the first case and the second case with NNC and NC codes being assigned to the two cases, respectively.

Figure 40:
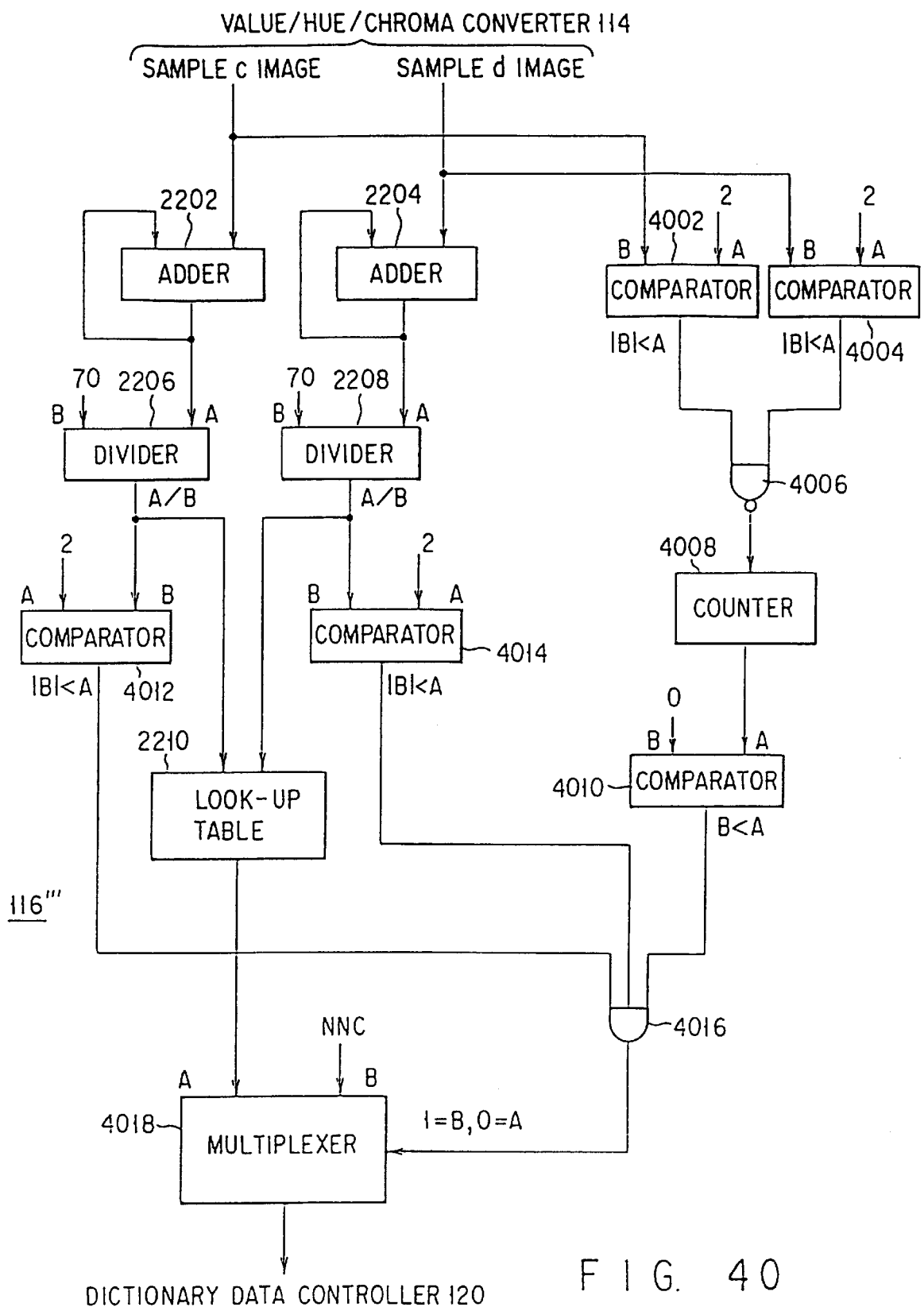
FIG. 40 is a block diagram of yet another construction of a color feature extractor.

A construction of such an extractor provided as a color feature extractor 116'" for effecting this discrimination is illustrated in FIG. 40. In FIG. 40, elements that are the same as those in FIG. 22 are assigned the same reference numerals and explanations of those elements are omitted. Mean values of c and d images that are read from converter 114 are calculated by adders 2202 and 2204 and dividers 2206 and 2208. Comparators 4002 and 4004 receive each c and d pixel image value, respectively, and compare the absolute value of the received value with 2. Each comparator 4002 or 4004 outputs a 1 if the absolute pixel value is less than 2, and otherwise outputs 0. Both comparator outputs are applied to a NAND gate 4006 so that the NAND gate will provide a non-zero output if both the c and d components of any pixel have an absolute magnitude of 2 or more, i.e., if any pixel is a color pixel. A counter 4008 counts such color pixels. The result counted by counter 4008 is applied to a comparator 4010 that provides a non-zero output if the counted result is greater than 0, i.e., in the case of at least one color pixel.

Comparators 4012 and 4014 compare the absolute value of the c and d image data, respectively, to determine if the absolute mean value is less than 2. The outputs of comparators 4010, 4012, and 4014 are applied to an AND gate 4016. AND gate 4016 provides a 1 output only for the NNC case in which the absolute mean values of the c and d image data are each less than 2 and there is at least one color pixel. A multiplexer 4018 is responsive to the output of AND gate 4016 to output the NNC code or the output of look-up table 2210 to dictionary controller 120.

While several embodiments of the invention have been disclosed including circuitry for performing described functions, the invention is not so limited. Those skilled in the art will now recognize that the described functions can be practiced with equal effectiveness with software implementations of the disclosed circuitry. For example and without limitation, the functions performed by the components of image averaging section 112 as illustrated in FIG. 15 can be performed with equal effectiveness by a microprocessor provided with memory resources and programmed to carry out those functions.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

We claim:

1. An apparatus for identifying an image represented by digital image data, comprising:

means for extracting feature data from the digital image data representing predetermined color features of the whole image to be identified;

first means for storing a plurality of categories corresponding to color features;

second means for storing a plurality of target image data grouped based on the color features of the categories respectively;

means for selecting one of the categories corresponding to a color feature of the digital image data from the first storing means;

means for comparing the digital image data with the plurality of target image data grouped by the category selected by the selecting means;

means for determining a most similar target image data in the plurality of image data in the second storing means grouped by the selected categories based on a comparison result by the comparing means; and means for determining a similarity between the digital image data and the target image data in the second storing means grouped by the selected category by the selecting means.

2. The apparatus of claim 1, wherein the digital image data includes color image data, and further including means, responsive to the digital image data for determining selected ones of the color characteristics includes color value means for determining hue (H), value (v), and chroma (C) values corresponding to the digital image data.

3. The apparatus of claim 2, wherein the color value means includes means for computing values of predetermined color components corresponding to the H, V, and C values.

4. The apparatus of claim 3, wherein the means for extracting includes means for extracting the feature data in accordance with the values of selected ones of the predetermined color components.

5. The apparatus of claim 1, wherein the target image data includes information representative of a size of the at least one target image and the feature data includes information representative of a size of the image to be identified; and the means for extracting including means for extracting the image size information of the image to be identified.

6. The apparatus of claim 1, further including:

a data base for storing relative data related to the at least one target image;

a data base controller, responsive to the similarity determining means, for retrieving from the data base the relative data related to the retrieved target image data determined by the similarity determining means to be similar to the digital image data; and means for displaying the relative data retrieved by the data base controller.

7. The apparatus of claim 6, further including a user interface to enable a user to access the relative data in the data base.

8. The apparatus of claim 3, wherein the similarity determining means includes:

means for computing a first similarity factor between the digital image data and the retrieved target image data for each of the predetermined color components;

means for computing a second similarity factor as a predetermined function of the respective first similarity factors computed for the predetermined color components; and means for selecting a most similar target image in accordance with the second similarity factor.

9. The apparatus of claim 3, wherein the similarity determining means includes:

means for computing a cumulative difference between the digital image data and the retrieved target image data for each of the predetermined color components; and means for selecting the target image for which the cumulative difference is smallest.

10. The apparatus of claim 1, wherein the digital image data includes color characteristics of selected pixels of the image to be identified; and wherein the extracting means includes:

means for computing an average value of at least a predetermined one of the color characteristics for the selected pixels; and means, responsive to the computed average value, for providing the extracted feature data.

11. The apparatus of claim 10, further including means for determining selected ones of the color characteristics including hue (H), value (V), and chroma (C) values corresponding to the digital image data and means for computing values of predetermined color components corresponding to the H, V, and C values;

the means for computing an average value includes means for computing an average value for at least one of the predetermined color components for the selected pixels; and the means for providing being responsive to the computed average value to provided the extracted feature data.

12. The apparatus of claim 10, wherein the color characteristic include R, G, and B component values for each of the selected pixels;

the means for computing an average value includes means for computing an average value of each of the R, G, and B components for the selected pixels; and the means for providing being responsive to the computed average values of the R, G. and B components to provided the extracted feature data.

13. The apparatus of claim 1, wherein the means for determining a similarity includes means to compute a cumulative difference between the digital image data and retrieved target data and determine similarity on the basis of a minimum cumulative difference.

14. An apparatus for identifying an image represented by digital image data, comprising:

a first circuit, coupled to receive predetermined positions of the digital image data, to compute a category parameter representative of predetermined color features;

a first memory to store a plurality of categories corresponding to color features;

a second memory to store a plurality of target image data grouped based on the color features of the categories respectively;

a memory controller to select one of the categories corresponding to a color feature of the digital image data from the first memory;

a second circuit to compare the digital image data with the plurality of target image data grouped by the category selected by the memory controller for determining a most similar target image data in the plurality of image data in the second memory grouped by the selected categories based on the comparison result; and a third circuit, coupled to receive the digital image data and the selected category, to determine a similarity parameter representative of a similarity between the digital image data and the target image data in the second memory grouped by the selected category.

15. The apparatus of claim 14, wherein the digital image data includes color image data and the predetermined features representing color characteristics of the whole image to be identified; and the apparatus further including a third circuit to determine selected ones of the color characteristics of the image to be identified.

16. The apparatus of claim 15, wherein the third circuit includes circuitry to determine hue (H), value (V), and chroma (C) values of the digital image data and predetermined color components corresponding to the H, V, and C values.

17. A system for identifying an image represented by digital image data, comprising:

means for forming a digital image which includes an object to be identified;

means for determining a cut-off portion of the digital image containing the object to be identified;

means for normalizing digital image data corresponding to the cut-off portion of the image;

means for computing average image data for selected pixels of the normalized image data;

means for extracting color features corresponding to predetermined ones of a predetermined color components, the color features representing the digital image;

a first memory to store a plurality of categories corresponding to color features;

a second memory to store a plurality of target image data grouped based on the color features of the categories respectively;

means for selecting one of the categories corresponding to a color feature of the digital image data from the first memory; and means for determining a similarity between the target image data in the second memory grouped by the selected category and the predetermined color components of the digital image data.

18. An apparatus according to claim 1, wherein the second means for storing includes:

means for detecting a size of the feature data extracted by the extracting means; and means for storing the plurality of target image data grouped based on the color features of the categories in accordance with the size detected by the size detecting means.

19. An apparatus according to claim 14, wherein the second memory includes:

means for detecting a size of the feature data received by said first circuit; and means for storing the plurality of target image data grouped based on the color features of the categories in accordance with the size detected by the size detecting means.

20. An apparatus according to claim 17, wherein the second memory includes:

means for detecting a size of the feature data extracted by the extracting means; and means for storing the plurality of target image data grouped based on the color features of the categories in accordance with the size detected by the size detecting means.

* * * * *

UNITED STATES PATENT AND TRADEMARK OFFICE
CERTIFICATE OF CORRECTION

PATENT NO. : 6,047,085
DATED : April 4, 2000
INVENTOR(S) : Toshio Sato et al.

It is certified that error appears in the above-identified patent and that said Letters Patent is hereby corrected as shown below:

Claim 2, col. 18, line 56, "(v)" should read --V--.

Claim 11, col. 19, line 58, "provided" should read --provide--.

Claim 12, col. 19, lines 59-60, "characteristic" should read --characteristics--.

Claim 12, col. 19, line 67, "provided" should read --provide--.

Claim 17, col. 20, lines 55-56, "a predetermined color components" should read --a predetermined color component--.

Signed and Sealed this

Fifth Day of June, 2001

*Attest:*

*Attesting Officer*

NICHOLAS P. GODICI

*Acting Director of the United States Patent and Trademark Office*